(12) United States Patent
Katis et al.

(10) Patent No.: US 8,325,662 B2
(45) Date of Patent: Dec. 4, 2012

(54) APPARATUS AND METHOD FOR ENABLING COMMUNICATION WHEN NETWORK CONNECTIVITY IS REDUCED OR LOST DURING A CONVERSATION AND FOR RESUMING THE CONVERSATION WHEN CONNECTIVITY IMPROVES

(75) Inventors: Thomas E. Katis, Jackson, WY (US); James T. Panttaja, Healdsburg, CA (US); Mary G. Panttaja, Healdsburg, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 590 days.

(21) Appl. No.: 12/552,994

(22) Filed: Sep. 2, 2009

(65) Prior Publication Data

US 2010/0069060 A1 Mar. 18, 2010

Related U.S. Application Data

(63) Continuation-in-part of application No. 12/212,592, filed on Sep. 17, 2008, now Pat. No. 7,751,361, and a continuation-in-part of application No. 12/212,595, filed on Sep. 17, 2008, now Pat. No. 7,751,362.

(60) Provisional application No. 61/157,108, filed on Mar. 3, 2009, provisional application No. 61/228,206, filed on Jul. 24, 2009.

(51) Int. Cl.
*H04Q 7/00* (2006.01)

(52) U.S. Cl. ...................................................... 370/329

(58) Field of Classification Search ...................... None
See application file for complete search history.

(56) References Cited

U.S. PATENT DOCUMENTS

| | | |
|---|---|---|
| 4,790,003 A | 12/1988 | Kepley et al. |
| 4,807,224 A | 2/1989 | Naron et al. |
| 5,117,422 A | 5/1992 | Hauptschein et al. |
| 5,222,189 A | 6/1993 | Fielder |
| 5,283,818 A | 2/1994 | Klausner et al. |
| 5,375,018 A | 12/1994 | Klausner et al. |
| 5,390,236 A | 2/1995 | Klausner et al. |
| 5,487,167 A | 1/1996 | Dinallo et al. |
| 5,524,140 A | 6/1996 | Klausner et al. |
| 5,572,576 A | 11/1996 | Klausner et al. |
| 5,611,038 A | 3/1997 | Shaw et al. |
| 5,617,145 A | 4/1997 | Huang et al. |
| 5,692,213 A | 11/1997 | Goldberg et al. |
| 5,734,963 A | 3/1998 | Fitzgerald et al. |
| 5,737,011 A | 4/1998 | Lukacs |

(Continued)

FOREIGN PATENT DOCUMENTS

EP 1715648 10/2006

(Continued)

OTHER PUBLICATIONS

U.S. Appl. No. 12/948,707, filed Nov. 17, 2010.

(Continued)

*Primary Examiner* — Hassan Phillips
*Assistant Examiner* — Prenell Jones
(74) *Attorney, Agent, or Firm* — Beyer Law Group LLP

(57) ABSTRACT

A method for enabling communication when network connectivity is reduced or lost during a conversation and for resuming the same conversation when connectivity improves.

42 Claims, 18 Drawing Sheets

U.S. PATENT DOCUMENTS

| | | |
|---|---|---|
| 5,878,120 A | 3/1999 | O'Mahnony et al. |
| 5,918,158 A | 6/1999 | LaPorta et al. |
| 5,963,551 A | 10/1999 | Minko |
| 5,970,122 A | 10/1999 | LaPorta et al. |
| 6,037,932 A | 3/2000 | Feinleib |
| 6,092,120 A | 7/2000 | Swaminathan et al. |
| 6,104,757 A | 8/2000 | Rhee |
| 6,118,763 A | 9/2000 | Trumbull et al. |
| 6,175,619 B1 | 1/2001 | DeSimone |
| 6,223,210 B1 | 4/2001 | Hickey et al. |
| 6,229,849 B1 | 5/2001 | Mihara |
| 6,233,389 B1 | 5/2001 | Barton et al. |
| 6,262,994 B1 | 7/2001 | Dirschedl et al. |
| 6,272,166 B1 | 8/2001 | Dabak et al. |
| 6,301,265 B1 | 10/2001 | Kleider et al. |
| 6,378,035 B1 | 4/2002 | Parry et al. |
| 6,480,783 B1 | 11/2002 | Myr |
| 6,507,586 B1 | 1/2003 | Satran et al. |
| 6,564,261 B1 | 5/2003 | Gudjonsson et al. |
| 6,577,599 B1 | 6/2003 | Gupta et al. |
| 6,577,631 B1 | 6/2003 | Keenan et al. |
| 6,580,694 B1 | 6/2003 | Baker |
| 6,671,732 B1 | 12/2003 | Weiner |
| 6,717,925 B1 | 4/2004 | Leppisaari et al. |
| 6,721,703 B2 | 4/2004 | Jackson et al. |
| 6,724,869 B2 | 4/2004 | Chapman et al. |
| 6,791,949 B1 | 9/2004 | Ryu et al. |
| 6,807,565 B1 | 10/2004 | Dodrill et al. |
| 6,807,578 B2 | 10/2004 | Satran et al. |
| 6,829,473 B2 | 12/2004 | Raman et al. |
| 6,834,039 B1 | 12/2004 | Kelly et al. |
| 6,850,965 B2 | 2/2005 | Allen |
| 6,912,544 B1 | 6/2005 | Weiner |
| 6,931,114 B1 | 8/2005 | Martin |
| 6,970,926 B1 | 11/2005 | Needham et al. |
| 6,973,309 B1 | 12/2005 | Rygula et al. |
| 6,993,009 B2 | 1/2006 | Kelly et al. |
| 6,996,624 B1 | 2/2006 | LeCroy et al. |
| 7,002,913 B2 | 2/2006 | Huang et al. |
| 7,039,040 B1 | 5/2006 | Burg |
| 7,039,675 B1 | 5/2006 | Kato |
| 7,047,030 B2 | 5/2006 | Forsyth |
| 7,111,044 B2 | 9/2006 | Lee |
| 7,117,521 B2 | 10/2006 | Puthiyedath |
| 7,139,371 B2 | 11/2006 | McElvaney |
| 7,171,491 B1 | 1/2007 | O'Toole et al. |
| 7,187,941 B2 | 3/2007 | Siegel |
| 7,218,709 B2 | 5/2007 | Garg et al. |
| 7,233,589 B2 | 6/2007 | Tanigawa et al. |
| 7,236,738 B2 | 6/2007 | Settle |
| 7,240,105 B2 | 7/2007 | Satran et al. |
| 7,304,951 B2 | 12/2007 | Rhee |
| 7,305,438 B2 | 12/2007 | Christensen et al. |
| 7,313,593 B1 | 12/2007 | Pulito et al. |
| 7,349,871 B2 | 3/2008 | Labrou et al. |
| 7,382,881 B2 | 6/2008 | Uusitalo et al. |
| 7,403,775 B2 | 7/2008 | Patel et al. |
| 7,505,571 B2 | 3/2009 | Bhatia et al. |
| 7,626,951 B2 | 12/2009 | Croy et al. |
| 7,751,361 B2 * | 7/2010 | Katis et al. .................. 370/328 |
| 7,751,362 B2 * | 7/2010 | Katis et al. .................. 370/328 |
| 7,925,770 B1 * | 4/2011 | Hamel et al. ................. 709/231 |
| 8,059,663 B1 | 11/2011 | Mangal et al. |
| 2001/0025377 A1 | 9/2001 | Hinderks |
| 2002/0128029 A1 | 9/2002 | Nishikawa et al. |
| 2002/0150094 A1 | 10/2002 | Cheng et al. |
| 2002/0154745 A1 | 10/2002 | Shtivelman |
| 2002/0159600 A1 | 10/2002 | Weiner |
| 2002/0181504 A1 | 12/2002 | Abel et al. |
| 2002/0181506 A1 | 12/2002 | Loguinov et al. |
| 2002/0184368 A1 | 12/2002 | Wang |
| 2003/0026394 A1 | 2/2003 | Chapman et al. |
| 2003/0027566 A1 | 2/2003 | Weiner |
| 2003/0028632 A1 | 2/2003 | Davis |
| 2003/0032426 A1 | 2/2003 | Gilbert et al. |
| 2003/0095642 A1 | 5/2003 | Cloutier et al. |
| 2003/0099198 A1 | 5/2003 | Kiremidjian et al. |
| 2003/0120822 A1 * | 6/2003 | Langrind et al. ............. 709/251 |
| 2003/0126162 A1 | 7/2003 | Yohe et al. |
| 2003/0186722 A1 | 10/2003 | Weiner |
| 2003/0223429 A1 | 12/2003 | Bi et al. |
| 2004/0017905 A1 | 1/2004 | Warrier et al. |
| 2004/0019539 A1 | 1/2004 | Raman et al. |
| 2004/0044783 A1 | 3/2004 | Nordberg |
| 2004/0074448 A1 | 4/2004 | Bunt |
| 2004/0090959 A1 | 5/2004 | Cinghita et al. |
| 2004/0095900 A1 | 5/2004 | Siegel |
| 2004/0117722 A1 | 6/2004 | Harada |
| 2004/0192353 A1 | 9/2004 | Mason et al. |
| 2004/0192378 A1 | 9/2004 | Wulkan |
| 2004/0252679 A1 | 12/2004 | Williams et al. |
| 2004/0255148 A1 | 12/2004 | Monteiro et al. |
| 2004/0258220 A1 | 12/2004 | Levine et al. |
| 2005/0021819 A1 | 1/2005 | Kilkki |
| 2005/0025308 A1 | 2/2005 | Tischer et al. |
| 2005/0030932 A1 | 2/2005 | Kelly et al. |
| 2005/0037706 A1 | 2/2005 | Settle |
| 2005/0053033 A1 | 3/2005 | Kelly et al. |
| 2005/0102358 A1 | 5/2005 | Gold et al. |
| 2005/0135333 A1 | 6/2005 | Rojas |
| 2005/0144247 A1 | 6/2005 | Christensen et al. |
| 2005/0160345 A1 | 7/2005 | Walsh et al. |
| 2005/0202807 A1 | 9/2005 | Ayyasamy |
| 2005/0207487 A1 | 9/2005 | Monroe |
| 2005/0215228 A1 | 9/2005 | Fostick et al. |
| 2005/0220137 A1 | 10/2005 | Prigent et al. |
| 2005/0259682 A1 | 11/2005 | Yosef et al. |
| 2005/0288101 A1 | 12/2005 | Lockton et al. |
| 2006/0007914 A1 | 1/2006 | Chandra et al. |
| 2006/0007943 A1 | 1/2006 | Fellman |
| 2006/0045038 A1 | 3/2006 | Kay et al. |
| 2006/0059267 A1 | 3/2006 | Cugi et al. |
| 2006/0059342 A1 | 3/2006 | Medvinsky et al. |
| 2006/0093304 A1 | 5/2006 | Battey et al. |
| 2006/0107285 A1 | 5/2006 | Medvinsky |
| 2006/0146822 A1 | 7/2006 | Kolakowski et al. |
| 2006/0187897 A1 | 8/2006 | Dabbs et al. |
| 2006/0189305 A1 | 8/2006 | Ando et al. |
| 2006/0212582 A1 | 9/2006 | Gupta et al. |
| 2006/0212592 A1 | 9/2006 | Gupta et al. |
| 2006/0224748 A1 | 10/2006 | Gupta et al. |
| 2006/0244588 A1 | 11/2006 | Hannah et al. |
| 2006/0245367 A1 | 11/2006 | Jeffery et al. |
| 2006/0253599 A1 | 11/2006 | Monteiro et al. |
| 2006/0268750 A1 | 11/2006 | Weiner |
| 2006/0274698 A1 | 12/2006 | Twitchell |
| 2006/0276714 A1 | 12/2006 | Holt et al. |
| 2006/0282544 A1 | 12/2006 | Monteiro et al. |
| 2006/0288391 A1 | 12/2006 | Puthiyedath |
| 2006/0294259 A1 | 12/2006 | Matefi et al. |
| 2007/0001869 A1 | 1/2007 | Hunzinger |
| 2007/0086485 A1 * | 4/2007 | Vega-Garcia et al. ........ 370/468 |
| 2007/0159321 A1 | 7/2007 | Ogata et al. |
| 2007/0177626 A1 | 8/2007 | Kotelba et al. |
| 2007/0180032 A1 | 8/2007 | Pearson |
| 2007/0182819 A1 | 8/2007 | Monroe |
| 2007/0207785 A1 | 9/2007 | Chatterjee et al. |
| 2007/0230566 A1 | 10/2007 | Eleftheriadis et al. |
| 2008/0000979 A1 | 1/2008 | Poisner |
| 2008/0002621 A1 | 1/2008 | Ginzburg et al. |
| 2008/0002691 A1 | 1/2008 | Qi et al. |
| 2008/0005318 A1 | 1/2008 | Dong et al. |
| 2008/0086700 A1 | 4/2008 | Rodriguez et al. |
| 2008/0095173 A1 | 4/2008 | Bugenhagen |
| 2008/0130859 A1 | 6/2008 | Mclarty et al. |
| 2008/0134054 A1 | 6/2008 | Clark et al. |
| 2008/0154977 A1 | 6/2008 | Schmidt et al. |
| 2009/0003558 A1 | 1/2009 | Katis et al. |
| 2009/0063698 A1 | 3/2009 | Xu et al. |
| 2009/0080415 A1 | 3/2009 | LeBlanc et al. |
| 2009/0103476 A1 | 4/2009 | Katis et al. |
| 2009/0103477 A1 | 4/2009 | Katis et al. |
| 2009/0103521 A1 | 4/2009 | Katis et al. |
| 2009/0161787 A1 | 6/2009 | Singh et al. |
| 2009/0175425 A1 | 7/2009 | Lee |
| 2010/0205320 A1 | 8/2010 | Katis et al. |

| | | | | |
|---|---|---|---|---|
| 2010/0211692 | A1* | 8/2010 | Katis et al. | 709/235 |
| 2012/0017004 | A1* | 1/2012 | Furbeck | 709/231 |
| 2012/0219131 | A1* | 8/2012 | Katis et al. | 379/93.01 |

FOREIGN PATENT DOCUMENTS

| | | |
|---|---|---|
| EP | 1725060 A1 | 11/2006 |
| WO | WO 03/073642 | 9/2003 |
| WO | WO 2006/096557 | 9/2006 |
| WO | WO 2006/114673 | 11/2006 |
| WO | WO 2007/026320 | 3/2007 |

OTHER PUBLICATIONS

"dircproxy," http://home.pcisys.net/~tbc/hacks/dircproxy.htm, Downloaded on Sep. 26, 2008, 1 page.
Apple Inc., "iPhone User's Guide," http://manuals.info.apple.com/en_US/iPhone_User_Guide.pdf, Downloaded on Oct. 3, 2008, 154 pages.
Brandx.net, "Using Talk," http://www.brandx.net/support/usingtelnet/talk.shtml, Downloaded on Sep. 19, 2008, 2 pages.
Businesswire.com "LignUp 4.0 Delivers Industry's Most Comprehensive Suite of Communications Web Services," http://www.businesswire.com/portal/site/google/index.jsp?ndmViewId=news_view&newsId=20070430005498&newsLang=en, Downloaded on Nov. 21, 2008, 10 pages.
Calore, Michael, "SpinVox Moves Into VoIP, Brings Voice-to-Text to Skype Users," Monkey_Bites, http://blog.wired.com/monkeybites/2007/08/spinvox-moves-i.html, Downloaded on Oct. 3, 2008, 4 pages.
Cardei et al., "MAC Layer QoS Support for Wireless Networks of Unmanned Air Vehicles," Proceedings of the 37th Hawaii International Conference on System Sciences—2004, Jan. 5-8, 2004 pp. 9 pp.
Charny, Ben, "Nextel pushes new 'push to talk' features," URL: http://news.zdnet.com/2100-9584_22-134945.html, Mar. 18, 2004, 3 pages.
Chen et al., "An Adaptive Multimedia Transmission Protocol for Distributed Multimedia Applications," Proceedings of the 5th International Workshop on Multimedia Network Systems and Applications (MNSA '2003), in conjunction with The 23rd International Conference on Distributed Computing Systems (ICDCS-2003), 6 pages.
Dannen, Chris, "Technology: The Skype Mobile Phone Will Blow Your Mind," Dec. 18, 2007, URL: http://www.fastcompany.com/blog/chris-dannen/lab/technology-skype-mobile-phone-will-blow-your-mind, 2 pages.
Erwu et al., "Packet-late indication based (PLIB): adaptive jitter buffer," ACM International Conference Proceeding Series; vol. 58, Proceedings of the winter international symposium on Information and communication technologies, Cancun, Mexico, SESSION: Performance, reliability, and quality of service, pp. 1-5 Year of Publication: 2004.
FAQS.org, "RFC1644—T/TCP—TCP Extensions for Transactions Functional S," http://www.faqs.org/rfcs/rfc1644.html, Downloaded on Sep. 19, 2008, 26 pages.
FluidVoice "Overview of FluidVoice," http://viral.media.mit.edu/wiki/tiki-index.php?page=FluidVoice, Downloaded on Sep. 16, 2008, 2 pages.
GrandCentral.com, "Call Record," http://www.grandcentral.com/howitworks/call_record, Downloaded on Sep. 26, 2008, 1 page.
GrandCentral.com, "One Voicemail Box," http://www.grandcentral.com/home/one_voicemail, Downloaded on Sep. 26, 2008, 1 page.
GrandCentral.com, "So Many Features, You Won't Believe it," http://www.grandcentral.com/support/howitworks/, Downloaded on Sep. 26, 2008, 1 page.
GrandCentral.com, "Voicemail forwarding," http://www.grandcentral.com/howitworks/voicemail_forwarding, Downloaded on Sep. 26, 2008, 1 page.
Henshall, Stuart, "HotRecorder—Record Skype Calls," Skype Journal, URL: http://skypejournal.com/blog/archives/2005/03/hotrecorder_rec.php, Mar. 25, 2005, 11 pages.
IRCHelp.org, "An IRC Tutorial," http://www.irchelp.org/irchelp/irctutorial.html , Downloaded on Sep. 26, 2008, 14 pages.
Kadoink.com, "Get a Widget," http://www.kadoink.com/index.cfm?action=getWidgets, Downloaded on Sep. 19, 2008, 3 pages.
Krishnan et al., "EVRC-Wideband: The New 3GPP2 Wideband Vocoder Standard," IEEE International Conference on Acoustics, Speech and Signal Processing, 2007. ICASSP 2007, Publication Date: Apr. 15-20, 2007, vol. 2, On pp. II-333-II-336, Honolulu, HI.
Layton, Julia, "How Slingbox Works," Jan. 4, 2006, HowStuffWorks.com, http://electronics.howstuffworks.com/slingbox.htm, 9 pages.
LignUp.com, "LignUp Communications Applications Server," http://www.lignup.com/platform/index.html, Downloaded on Sep. 19, 2008, 1 page.
Network Dictionary, "Instant Message (IM) Technology Overview," http://www.networkdictionary.com/networking/im.php, Downloaded on Sep. 16, 2008, 2 pages.
Nikotalkie.com, "Nikotalkie—Home," http://www.nikotalkie.com/, Downloaded on Sep. 19, 2008, 2 pages.
Nikotel.com, "Click-Pop-Talk WebStart Phone," http://www.nikotel.com/nikotel-click-pop-talk-java-phone.html, Downloaded on Sep. 19, 2008, 1 page.
Notaras, George, "dircproxy IRC Proxy," http://www.g-loaded.eu/2007/02/01/dircproxy-irc-proxy/, Downloaded on Sep. 26, 2008, 4 pages.
Pash, Adam, "Consolidate Your Phones with GrandCentral," http://techgroup.groups.vox.com/library/post/6a00cd978d0ef7f9cc00e398b8ff7a0002.html, Downloaded on Sep. 19. 2008, 5 pages.
Patel, Nilay, "Apple patent reveals data-to-voice translation system for cellphones," Jul. 28, 2007, URL: http://www.engadget.com/2007/07/28/apple-patent-reveals-data-to-voice-translation-system-for-cellph/, 5 pages.
Piecuch et al., "A Selective Retransmission Protocol for Multimedia on the Internet," In Proceedings of SPIE Multimedia Systems and Applications, Nov. 2000, Boston MA, USA, 12 pages.
Qiao et al., "SCTP Performance Issue on Path Delay Differential," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.
Ramo et al., "On comparing speech quality of various narrow- and wideband speech codecs," Proceedings of the Eighth International Symposium on Signal Processing and Its Applications, 2005. Publication Date: Aug. 28-31, 2005, Volume: 2, On pp. 603-606.
Rey et al., "I-D ACTION:draft-ietf-avt-rtp-retransmission-09.txt," Aug. 5, 2003, http://osdir.com/ml/ietf.avt/2003-08/msg00003.html, Downloaded on Sep. 19, 2008, 2 pages.
Ribbit.com, "Amphibian," http://www.ribbit.com/everyday/, Downloaded on Sep. 26, 2008, 1 page.
Ribbit.com, "Enhanced Visual Voicemail," http://www.ribbit.com/everyday/tour/enhanced_visual_voicemail.php, Downloaded on Sep. 26, 2008, 2 pages.
Ribbit.com, "What is Ribbit? Features," http://www.ribbit.com/platform/features.php, Downloaded on Sep. 26, 2008, 1 page.
Ribbit.com, "What is Ribbit? Overview," http://www.ribbit.com/platform/index.php, Downloaded on Sep. 26, 2008, 1 page.
Ribbit.com, "What is Ribbit? Voice Architecture," http://www.ribbit.com/platform/architecture.php, Downloaded on Sep. 26, 2008, 2 pages.
Saito et al., "IP Packet Loss Compensation Scheme with Bicast and Forwarding for Handover in Mobile Communications," 2006 IEEE 17th International Symposium on Personal, Indoor and Mobile Radio Communications, Sep. 2006, pp. 1-5, Helsinki.
Skype.com, "Making calls is just the start," URL: http://www.skype.com/features/, Downloaded on Sep. 16, 2008, 2 pages.
Spinvox.com, "Home Page," http://www.spinvox.com/, Downloaded on Sep. 26, 2008, 3 pages.
Spinvox.com, "How Does it Work?," http://www.spinvox.com/how_it_works.html, Downloaded on Sep. 19, 2008, 2 pages.
Swissvoice.net, "PSTN," http://www.swissvoice.net/ww/htm_ww/08_technology/content_pstn.html, Downloaded on Sep. 19, 2008, 3 pages.
Tektronix, "VOIP Technology Overview; Protocols, Convergence, Testing," http://www.tektronics.com/voip, May 12, 2006.

The Jabber Extensible Communications Platform™, "*Products // Jabber XCP*," URL: http://www.jabber.com/CE/JabberXCP, Downloaded on Sep. 16, 2008, 2 pages.

ThunkDifferent.com, "*YouMail vs. Google Grandcentral Voice Mail Service*," http://thunkdifferent.com/2007/10/11/youmail-vs-google-grandcentral-voice-mail-service!, Downloaded on Oct. 3, 2008, 6 pages.

VOIP-News.com, "*Company Profile, LignUp,* " http://www.voip-news.com/vendors/lignup/, Downloaded on Dec. 5, 2008, 6 pages.

WikiBooks, "*Internet Technologies/IRC*," http://en.wikibooks.org/wiki/Internet_Technologies/IRC, Downloaded on Sep. 19, 2008, 4 pages.

WikiPedia—The Free Encyclopedia, "*E-mail*," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.

WikiPedia—The Free Encyclopedia, "*Spinvox*," http://en.wikipedia.org/wiki/Spinvox, Downloaded on Sep. 26, 2008, 1 page.

WikiPedia—The Free Encyclopedia, "*TiVo*", http://en.wikipedia.org/wiki/TiVo, Downloaded on Sep. 16, 2008, 6 pages.

Yavuz et al., "*VoIP over cdma2000 1xEV-DO Revision A*," IEEE Communications Magazine, Feb. 2006, pp. 88-95.

HotRecorder.com, "*Features*," http://www.hotrecorder.com/music_features.asp, downloaded on Sep. 26, 2008, 1 page.

HotRecorder.com, "*Help*," http://www.hotrecorder.com/music_help.asp, downloaded on Sep. 26, 2008, 3 pages.

HotRecorder.com, "FAQs," http://www.hotrecorder.com/music_support.asp, downloaded on Sep. 26, 2008, 1 page.

WikiPedia—The Free Encyclopedia, "*Skype*," http://en.wikipedia.org/wiki/Skype, Downloaded on Sep. 26, 2008, 7 pages.

WikiPedia—The Free Encyclopedia, "*Skype Protocol*," http://en.wikipedia.org/wiki/Skype, Downloaded on Sep. 26, 2008, 4 pages.

Jabber.org, "*Main page*," http://www.jabber.org/web/main_page, Sep. 2, 2008, downloaded on Sep. 26, 2008, 1 page.

Jabber.org, "*FAQ*," http://www.jabber.org/web/faq, Sep. 4, 2008, downloaded on Sep. 26, 2008, 2 pages.

Apple Inc., "*iPhone: About Visual Voicemail*," http://www.support.apple.com/kb/HT1486, Downloaded on Sep. 26, 2008, 3 pages.

Jabber.org, "*Products // Jabber XCP // Benefits*," http://www.jabber.com/CE/JabberXCPBenefits, downloaded on Sep. 26, 2008, 1 page.

Jabber.org, "*Products //Jabber Clients*," http://www.jabber.com/CE/JabberClients, downloaded on Sep. 26, 2008, 1 page.

Jabber.org, "*Products // JabberNow*" http://www.jabber.com/CE/JabberNow, downloaded on Sep. 26, 2008, 1 page.

KillerStartups.com, "*Kadoink.com—Mobilizing your Socializing*," http://www.killerstartups.com/Web20/kadoink-com-moblizing-your-socializing, Downloaded on Sep. 26, 2008, 3 pages.

CNETNews.com, "*Kadoink's phonecast lines officially open for texting*," http://news.cnet.com/8301-17939_109-9829877-2.html, downloaded on Sep. 26, 2008, 1 page.

BusinessWire.com, "*LignUp 4.0 Delivers Industry's Most Comprehensive Suite of Communications Web Services,*" Apr. 30, 2007, http://www.businesswire.com/portal/site/google/?ndmViewId=news_view&newsId=20070430005498&newsLang=en, Downloaded on Sep. 26, 2008, 6 pages.

VOIP-News.com, "*Company Profile—LignUp*," http://www.voip-news.com/vendors/lignup/, Downloaded on Oct. 3, 2008, 6 pages.

JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.

WikiPedia—The Free Encyclopedia, "*Push To Talk*" http://en.wikipedia.org/wiki/Push_to_talk, Downloaded on Sep. 26, 2008, 3 pages.

WikiPedia—The Free Encyclopedia, "*Slingbox*" http://en.wikipedia.org/wiki/Slingbox, Downloaded on Sep. 26, 2008, 4 pages.

About.com, "*Linux / Unix Command: talk*,"http://linux.about.com/od/commands/l/blcmdl1_talk.htm, Downloaded on Sep. 26, 2008, 2 pages.

Fall, Kevin, "*A Delay-Tolerant Network Architecture for Challenged Internets*," Feb. 2003, http://www.dtnrg.org/docs/papers/IRB-TR-03-003.pdf, 15 pages.

Chuah et al., "*Store-and-Forward Performance in a DTN*," Vehicular Technology Conference, 2006. VTC 2006-Spring. IEEE 63$^{rd}$, Publication Date: May 7-10, 2006, Volume: 1, On pp. 187-191.

Krishnan, et al., "*The SPINDLE Disruption-Tolerant Networking System*," Military Communications Conference, 2007. MILCOM 2007. IEEE Volume , Issue , Oct. 29-31, 2007 pp. 1-7.

WikiPedia—The Free Encyclopedia, "*Visual Voicemail*" http://en.wikipedia.org/wiki/Visual_voicemail, downloaded on Sep. 26, 2008, 1 page.

Amir et al., "*An Overlay Architecture for High Quality VoIP Streams*,", IEEE Transactions on Multimedia, Publication Date: Dec. 2006, vol. 8, Issue:6, On pp. 1250-1262.

Rothermel et al., "*An Adaptive Stream Synchronization Protocol*," Lecture Notes In Computer Science; vol. 1018, Proceedings of the 5th International.Workshop on Network and Operating System Support for Digital Audio and Video, pp. 178-189, Year of Publication: 1995.

Baset et al., "*An Analysis of the Skype Peer-to-Peer Internet Telephony.Protocol*," INFOCOM 2006. 25th IEEE International Conference on Computer Communications. Proceedings (2006), pp. 1-11.

Cerf et al., "*A Protocol for Packet Network Intercommunication*," Communications, IEEE Transactions on, vol. 22, Issue 5, May 1974 pp. 637-648.

International Search Report in PCT application PCT/US2008/079227 mailed Feb. 5, 2009.

Written Opinion in PCT application PCT/US2008/079227 mailed Feb. 5, 2009.

Office Action dated Sep. 8, 2009 in European Patent Application No. 08839365.7.

WikiPedia—The Free Encyclopedia, "*Eudora (email client)*," http://en.wikipedia.org/wiki/Eudora_(e-mail_client), Downloaded on Aug. 20, 2009, 3 pages.

"*Eudora*," Answers.com, http://www.answers.com/topic/eudora-e-mail-client, Downloaded on Aug. 20, 2009, 4 pages.

"*The Eudora Open Messaging Advantage*," Qualconun, 1997, Part No. 100-50030-1, 23 pages.

"*Aspera—Next Generation File Transport—Broadcasting & Entertainment Media*," Asperasoft.com, http://www.asperasoft.com/en/industries/digital_media_10/Broadcast_Entertainment_Media_5, Downloaded on Sep. 22, 2009, 2 pages.

"*Aspera—Next Generation File Transport—fasp™ transfer limes*," Asperasoft.com, http://www.asperasoft.com/en/technology/fasp_transfer_times_14/fasp_transfer_times_14, Downloaded on Sep. 22, 2009, 1 page.

"*Aspera—Next Generation File Transport—the fasp solution*," Asperasoft.com, http://www.asperasoft.com/en/technology/fasp_solution_3/the_fasp_solution_3, Downloaded on Sep. 22, 2009, 3 pages.

"*Aspera—Next Generation File Transport—the shortcomings of TCP file transfer*," Asperasoft.com, http://www.asperasoft.com/en/technology/shortcomings_of_TCP_2/the_shortcomings_of_TCP_file_transfer_2, Downloaded on Sep. 22, 2009, 2 pages.

"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.

"Aspera fasp™ High Speed Transport- A Critical Technology Comparison," White Paper, Asperasoft.com, http://www.asperasoft.com/en/technology/white_papers_13/aspera_fasp_high_speed_transport_13, Downloaded on Sep. 22, 2009, 11 pages.

"*Palringo Brings First Push-to-Talk Application to the iPhone*," RedOrbit.com, http://www.redorbit.com/news/technology/1525545/palringo_brings_first_pushtotalk_application_to_the_iphone/index.html, Downloaded on Aug. 13, 2009, 2 pages.

*Palringo—Features*, Palringo.com, http://www.palringo.com/en/gb/features/features/, Downloaded on Aug. 13, 2009, 1 page.

Moren, Dan, "*Palringo Brings Picture Messaging to Iphone,*" http://www.pcworld.com/article/149108/palringo_brings_picture_messaging_to_iphone.html, Downloaded on Aug/ 13, 2009, 3 pages.

Paul, Ryan, "*Gmail gets Google Talk integration*,"Arstechnica.com, http://arstechnica.com/old/content/2006/02/6128.ars , Downloaded on Aug. 20, 2009, 1 page.

Sherman, Chris, "*Google Integrates Chat with Gmail*," Search Engine Watch, http://searchenginewatch.com/3583121, Feb. 7, 2006, Downloaded on Aug. 20, 2009, 2 pages.

"*About Gmail*," http://mail.google.com/mail/help/chat.html, Downloaded on Aug. 20, 2009, 3 pages.

WikiPedia—The Free Encyclopedia, "*Google Talk*," http://en.wikipedia,org/wiki/Google_Talk, Downloaded on Aug. 20, 2009, 8 pages.

Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.

Liaw, Kim Poh, "*Palringo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.

WikiPedia—The Free Encyclopedia, "*Palringo*" http://en.wikipedia.org/wiki/Palringo, Downloaded on Aug. 13, 2009, 1 page.

International Search Report in PCT application PCT/US2009/055925 mailed Dec. 7, 2009.

Written Opinion in PCT application PCT/US2009/055925 mailed Dec. 7, 2009.

Notice of Allowance in U.S. Appl. No. 12/212,592, mailed May 3, 2010.

Notice of Allowance in U.S. Appl. No.12/212,595, mailed Apr. 16, 2010.

Office Action dated Mar. 3, 2010 in European Patent Application No. 08839365.7.

Office Action mailed Jun. 29, 2011 in U.S. Appl. No. 12/767,730.

Office Action mailed Dec. 12, 2011 in U.S. Appl. No. 12/767,730.

Notice of Allowance in U.S. Appl. No. 12/767,730, mailed Apr. 13, 2012.

* cited by examiner

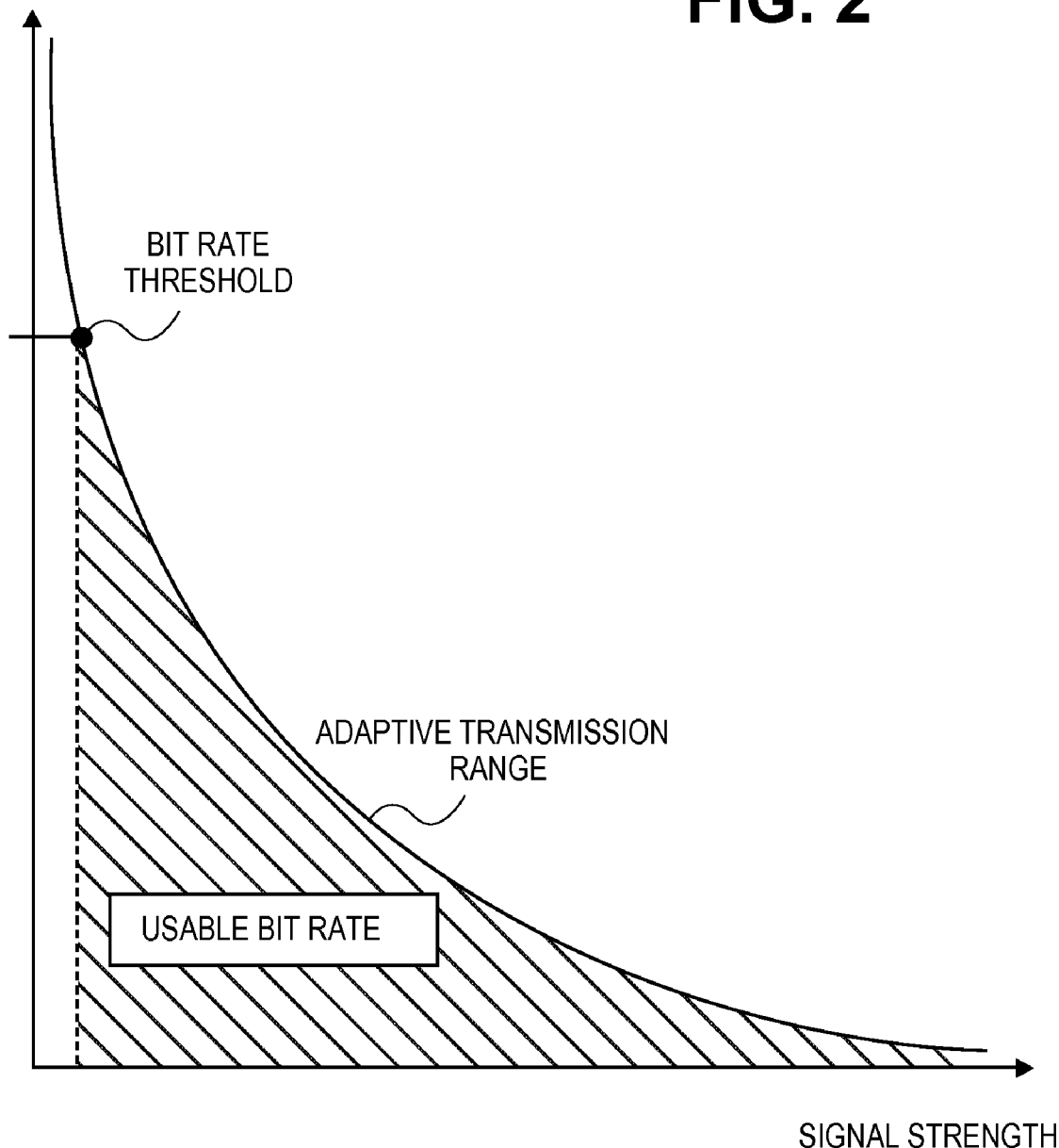

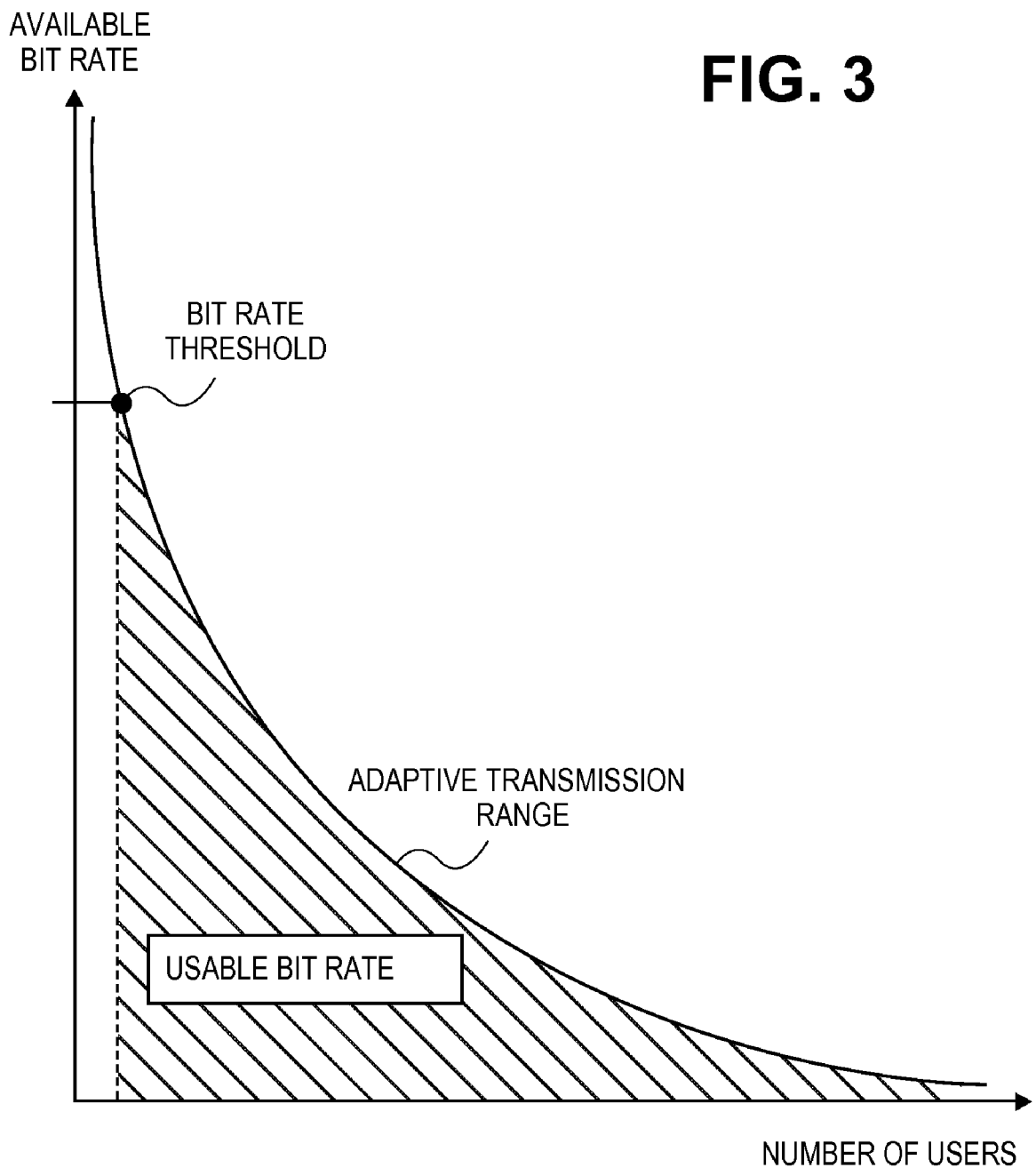

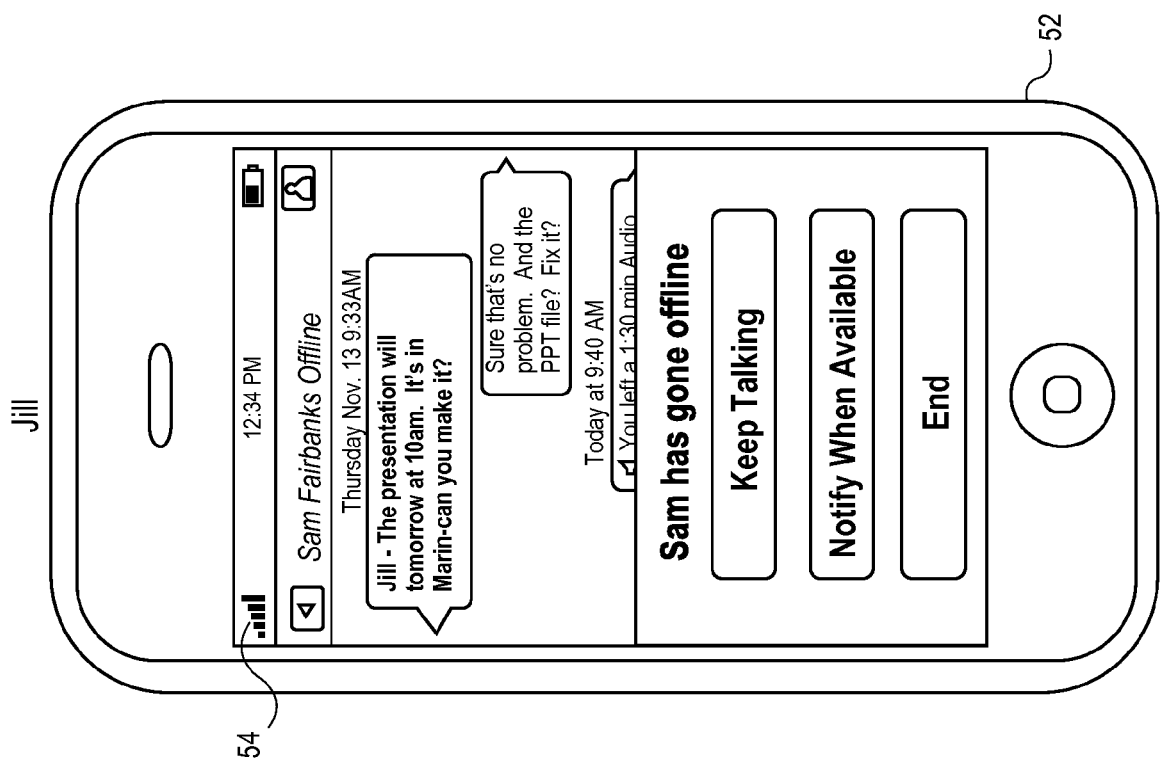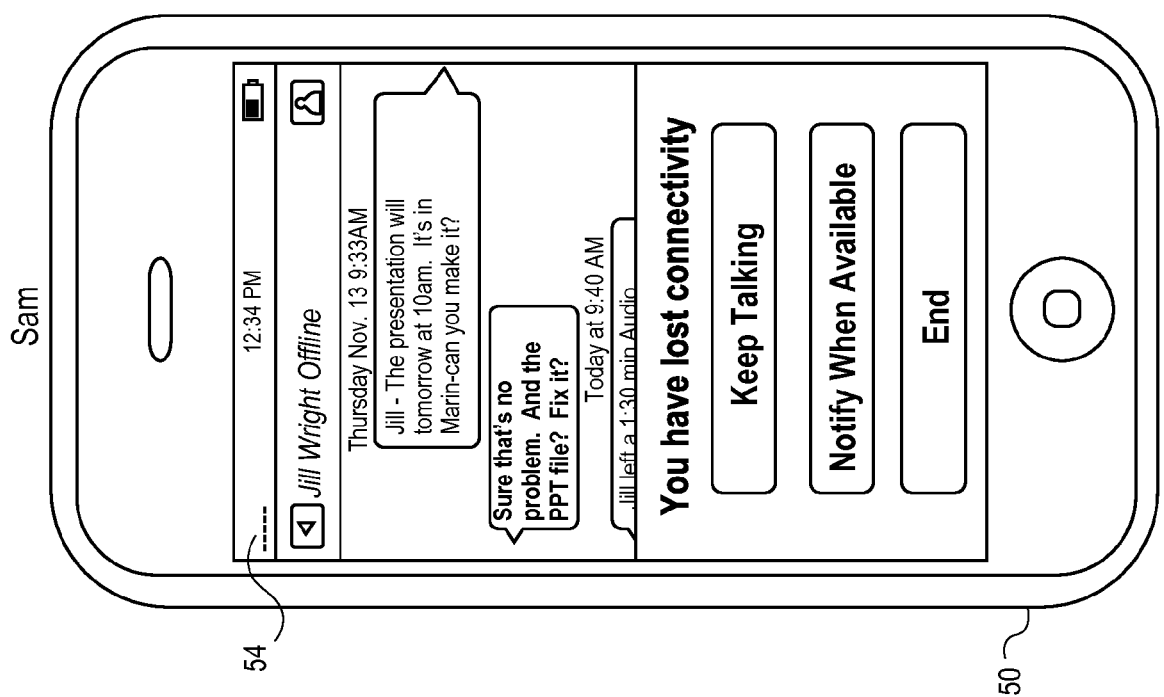
FIG. 7B

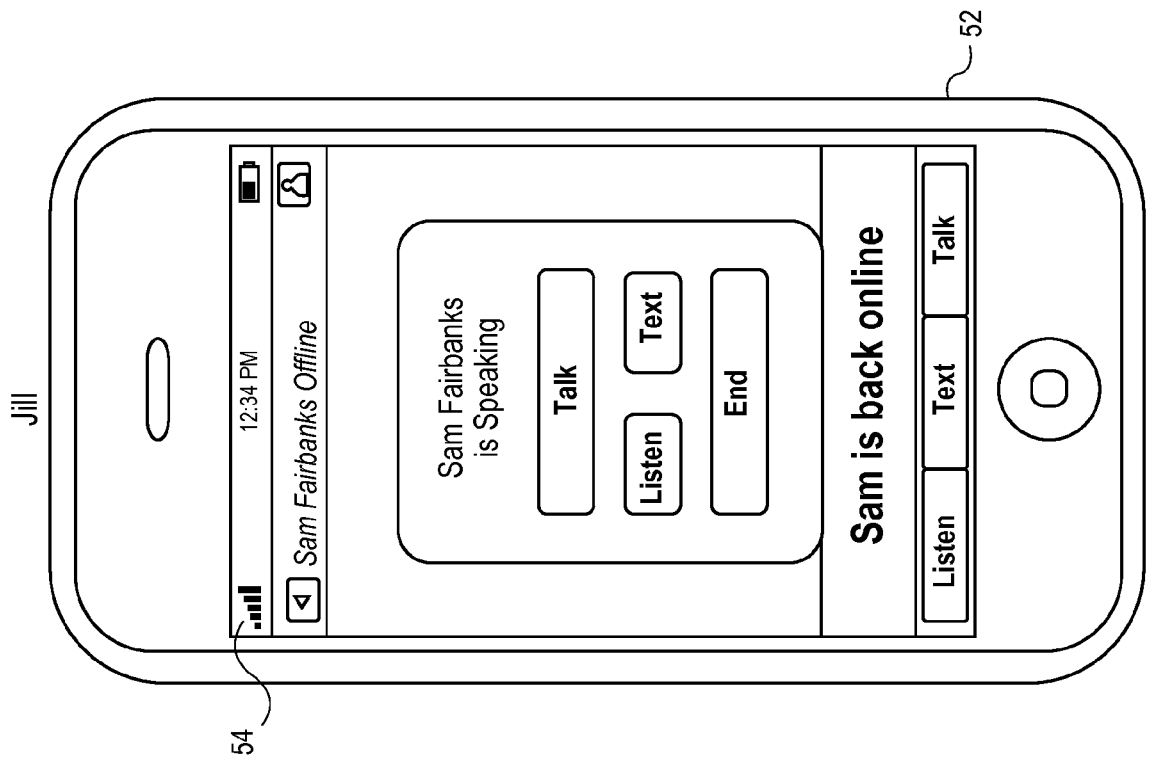
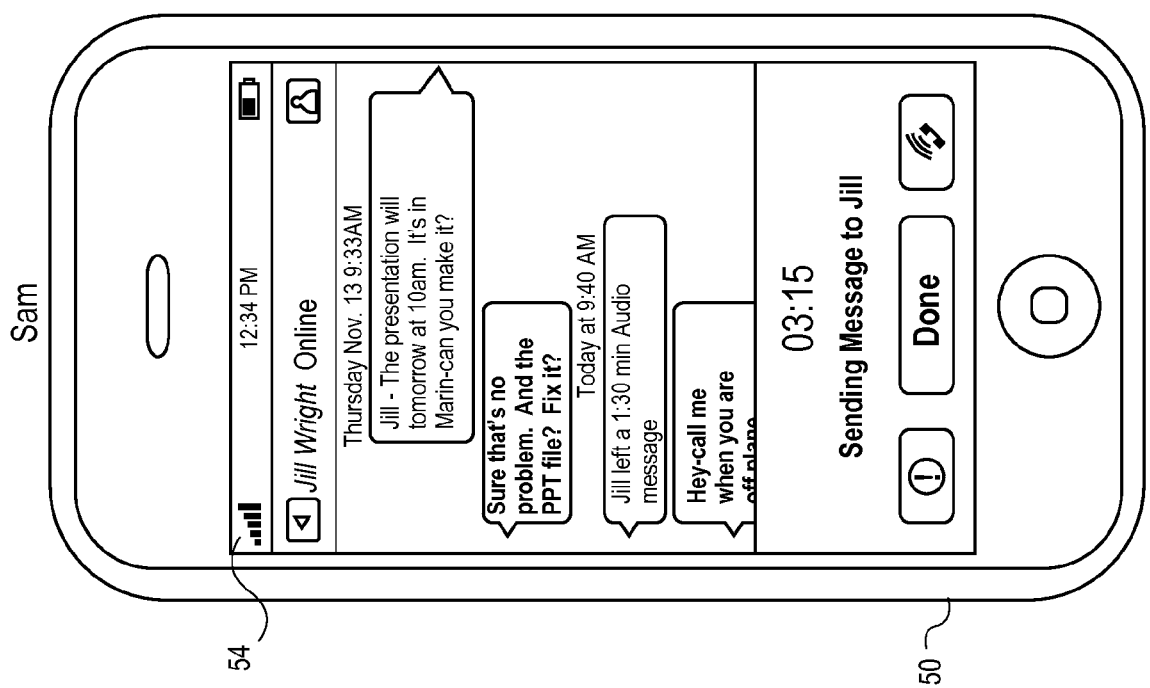
FIG. 7D

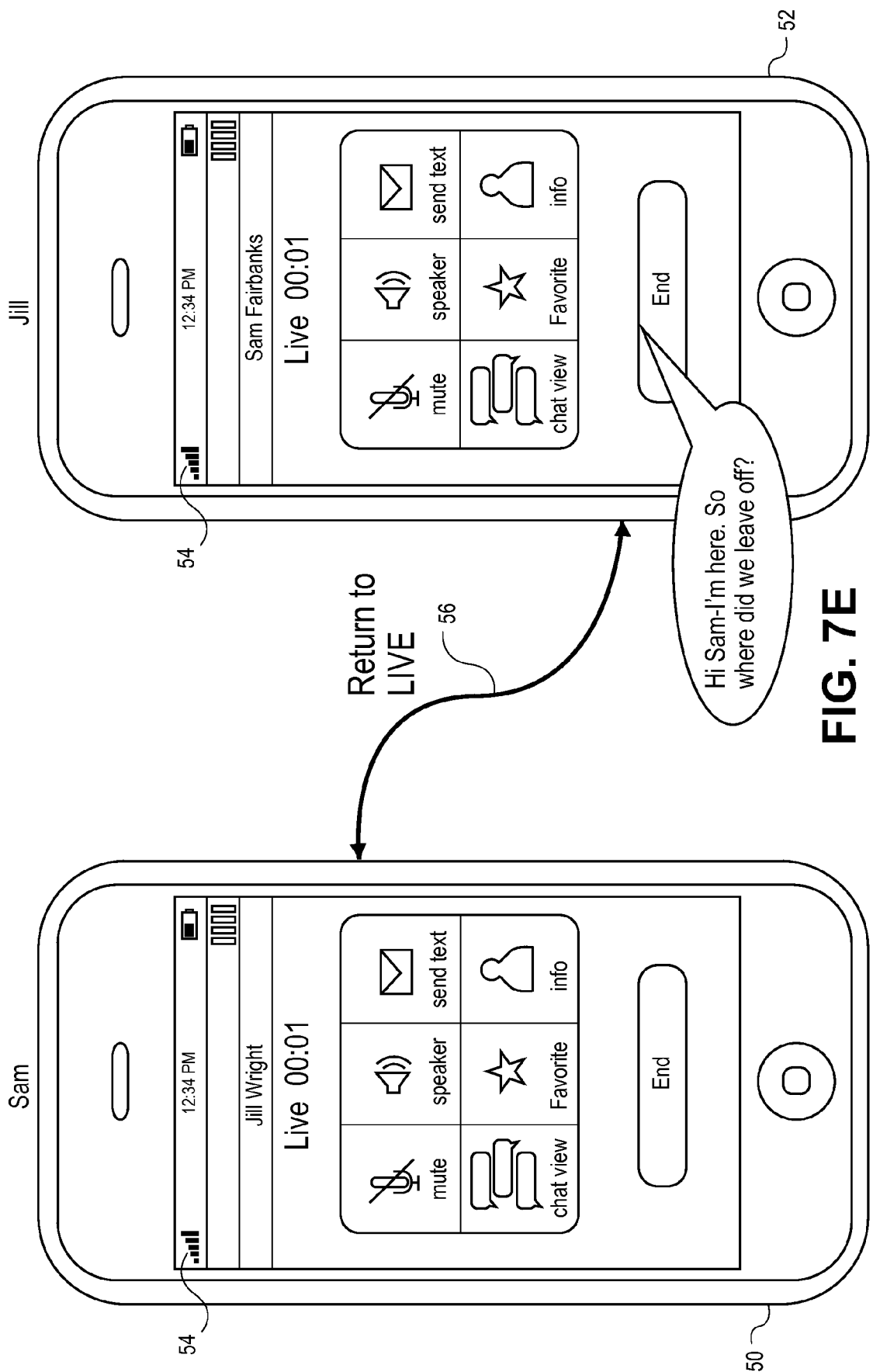

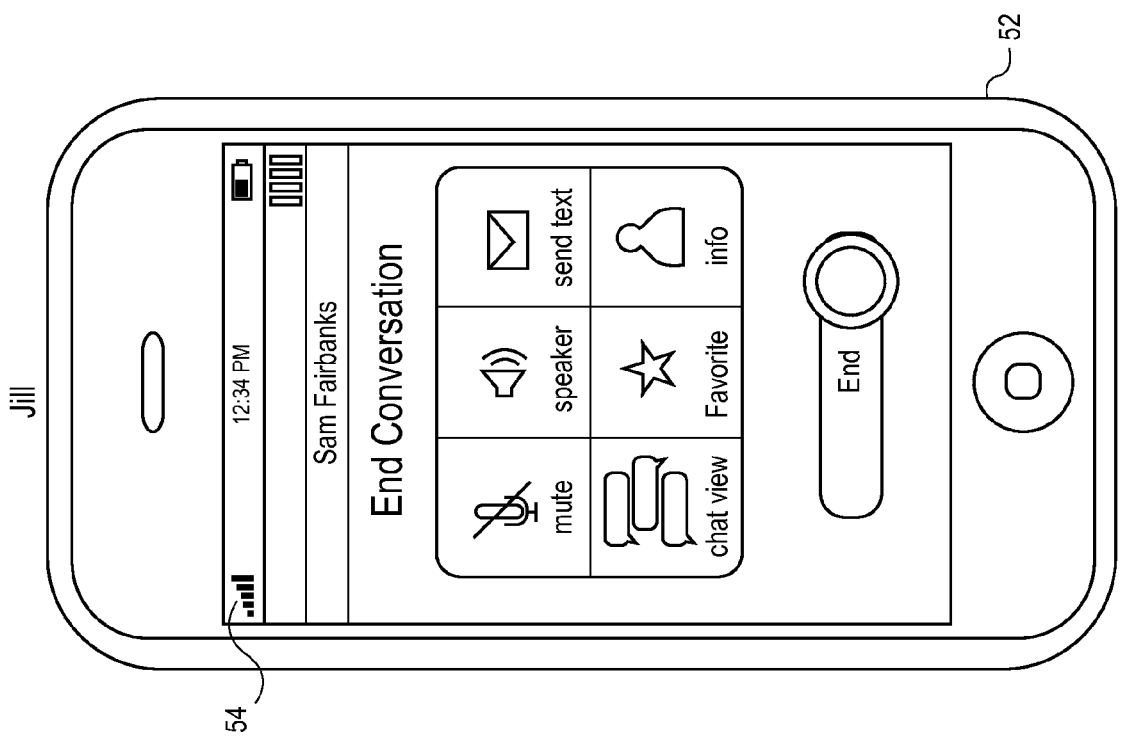
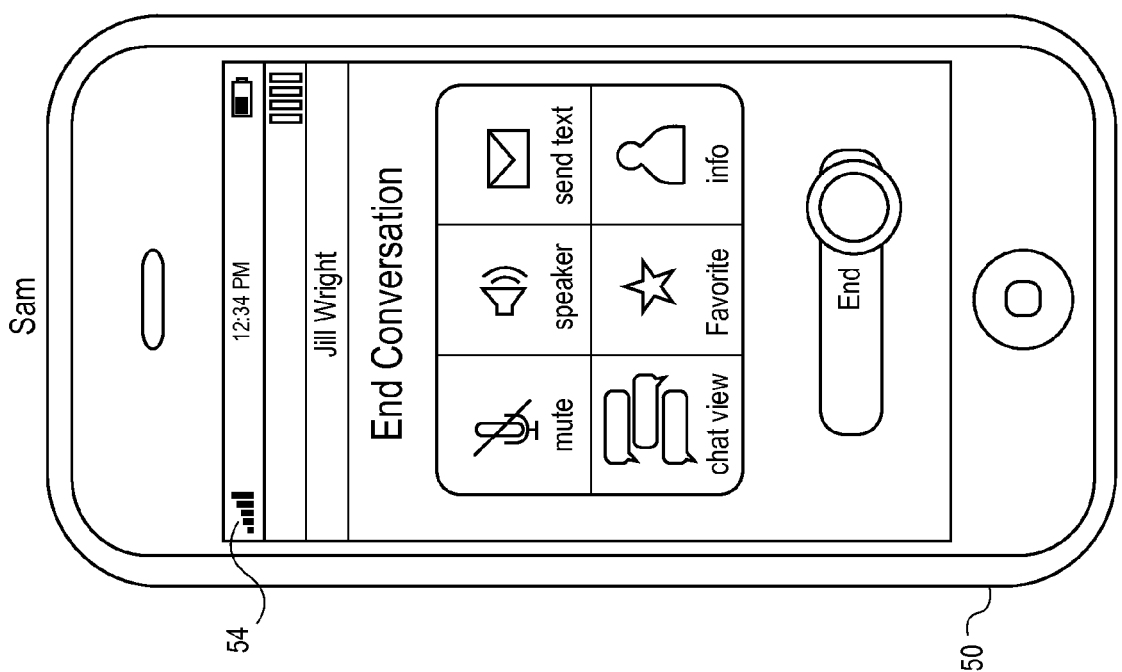
FIG. 7G

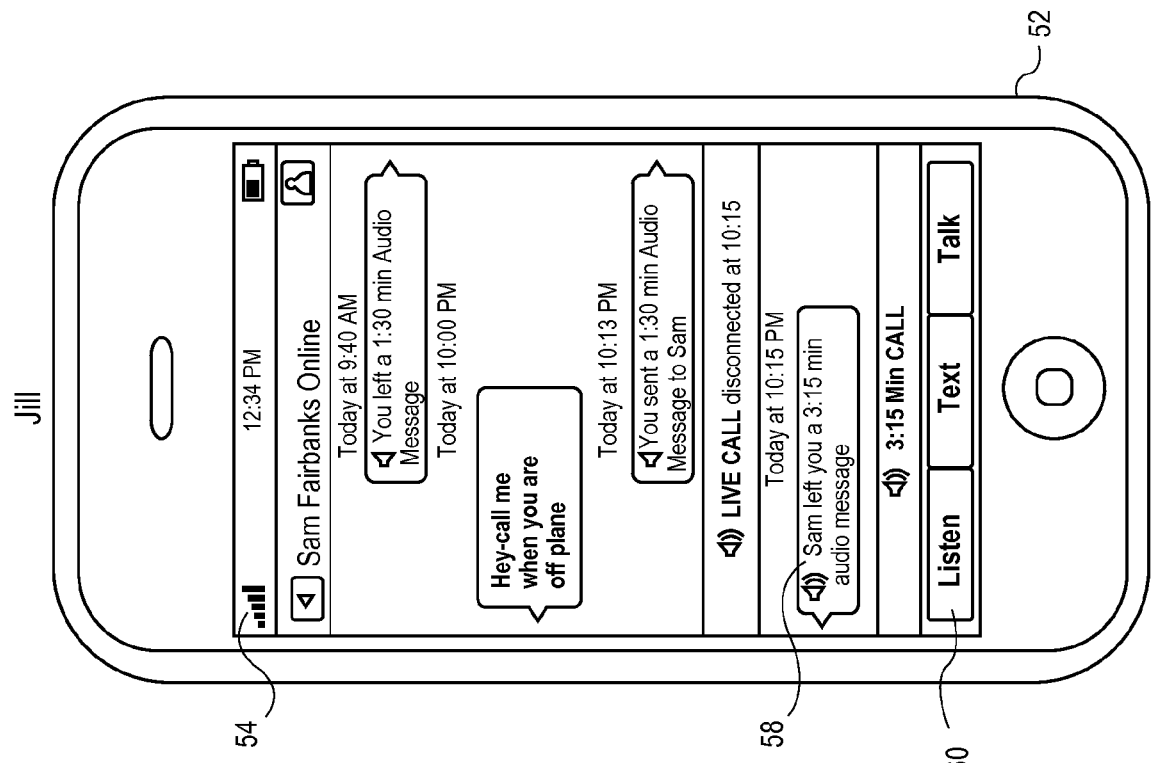
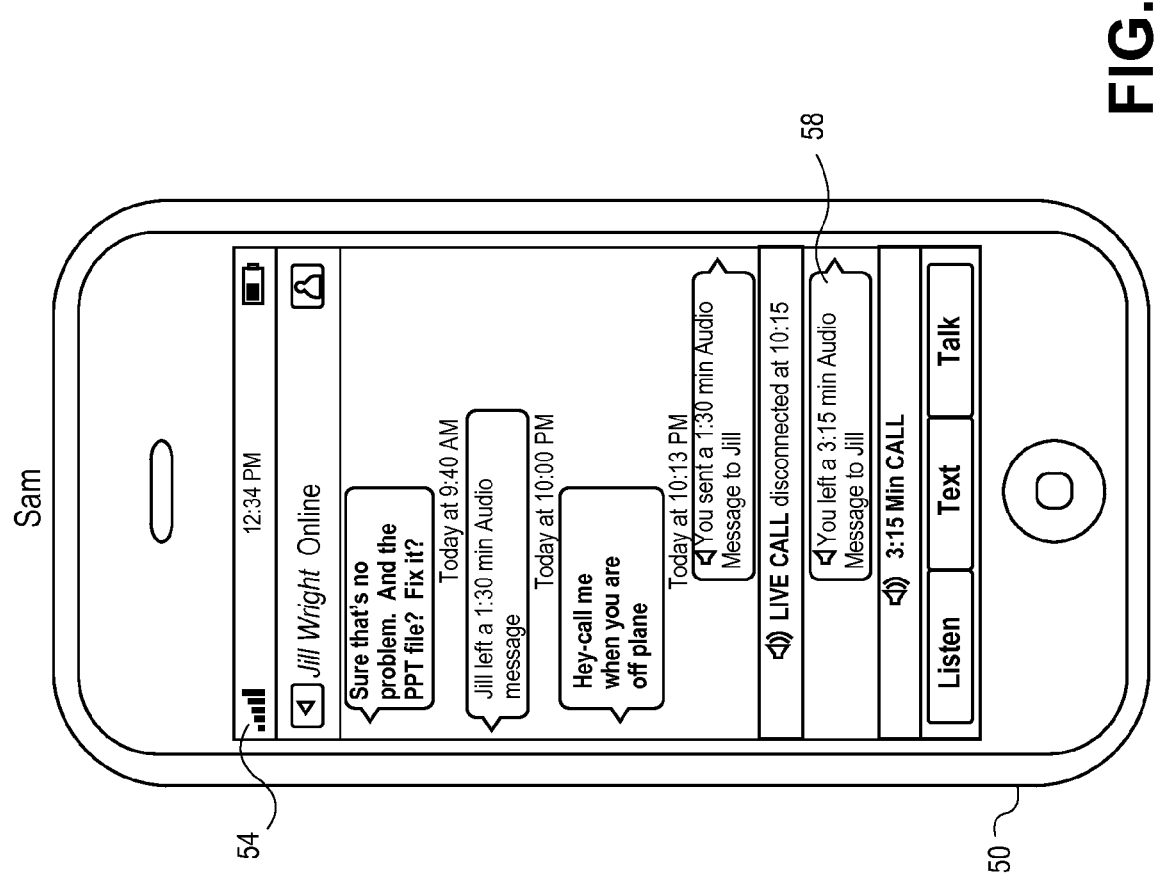
FIG. 7H

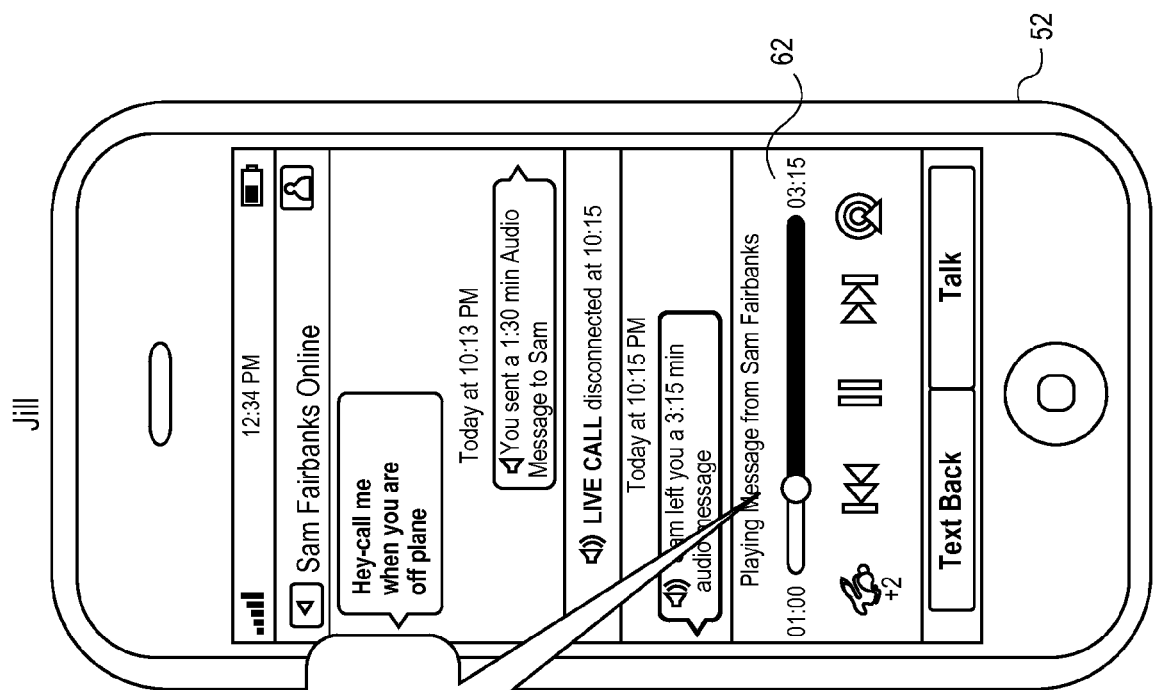
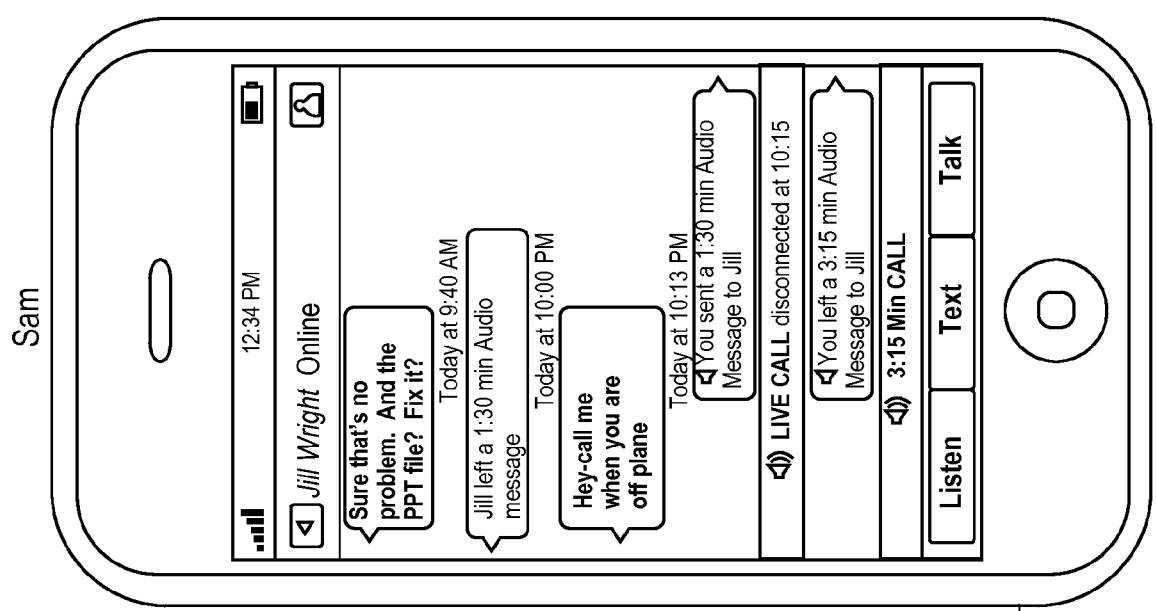
FIG. 7I

APPARATUS AND METHOD FOR ENABLING COMMUNICATION WHEN NETWORK CONNECTIVITY IS REDUCED OR LOST DURING A CONVERSATION AND FOR RESUMING THE CONVERSATION WHEN CONNECTIVITY IMPROVES

CROSS-REFERENCE TO RELATED APPLICATIONS

This application claims the benefit of priority to U.S. Provisional Patent Application No. 61/157,108, filed Mar. 3, 2009, entitled "Novel Modes of Communication," and to U.S. Provisional Patent Application No. 61/228,206, filed Jul. 24, 2009, and entitled "Apparatus and Method for Enabling Communication When Network Connectivity is Reduced or Lost During a Conversation and For Resuming the Conversation When Connectivity Improves on both Wireless and Wired Communication Networks." This application is also a Continuation-in-Part of U.S. application Ser. Nos. 12/212,592 and 12/212,595 both entitled "Graceful Degradation for Voice Communication Services over Wired and Wireless Networks." Each of the above-listed provisional and non-provisional applications is incorporated herein by reference in their entirety for all purposes.

BACKGROUND

1. Field of the Invention

This invention relates to electronic communications, and more particularly, to a method for enabling communication when network connectivity is reduced or lost during a conversation and for resuming the same conversation when connectivity improves.

2. Description of Related Art

Current wireless communications, such as mobile phones or radios, including tactical or first responder radios, support only real-time (i.e., live) communications. For communication to take place with existing wireless communication systems, a wireless network connection with a sufficient usable bit rate to support a real-time conversation must exist between the sending and receiving pair of wireless devices in communication with each other. If such a connection does not exist, then no communication can take place.

When a person is engaged in a conversation using their mobile phone, a network connection is established between the phone and the local radio transceiver (i.e., a cell tower). The network connection must have a sufficient usable bit rate to support a real-time conversation before any live communication can take place. As long the mobile phone is within the range of the radio transceiver, the signal strength or usable bit rate is typically more than adequate for conducting live phone conversations.

As the person using the mobile phone travels away from the radio transceiver, or they enter an area of poor coverage, such as in a tunnel or canyon, the usable bit rate or signal strength on the wireless network connection is typically reduced. If the distance becomes so great, or the reception so poor, the usable bit rate may be reduced beyond the range where live communication may take place. Beyond this range, the conversation is "dropped", and the user may no longer be able to continue the phone conversation.

Similarly, when too many users are conducting conversations on the network at the same time, the total aggregate bit rate for all the conversations may exceed the usable bit rate capacity of the radio transceiver. In such situations, certain conversations may be dropped or a connection refused in an effort to preserve the usable bit rate or capacity for other conversations. As the number of conversations on the network decreases, or usable bit rate conditions on the wireless network improve, dropped or refused users may again rejoin the network and make new conversations as capacity on the network improves.

In yet another example, external disturbances that affect the network may cause ongoing conversations to be dropped. For example, severe radio interference, such as a spike in electrical or electromagnetic radiation, the intentional jamming of the wireless network, the antenna on a phone, radio or the transmitter is damaged or is operating improperly for some reason, then the usable bit rate on the network connection may be insufficient for users to conduct real-time communications. As a result, no new conversations may be established altogether or ongoing conversations may be dropped.

Wired communication networks may also have capacity problems when too many users are attempting to use the network at the same time or there are external interferences degrading the performance of the network. In these situations, conversations are typically dropped and/or no new conversations can be made in order to preserve usable bandwidth for other users.

With both wireless and wired communication systems, there is no persistent storage of the media of conversations. When a person engages in a conversation using a mobile phone, radio or landline phone, there is no storage of the media of the conversations other than possibly buffering as necessary for transmission and rendering. Consequently, both wireless and wired communication systems are reliant on network connections. If at any point the usable bit rate on the network is insufficient for a real-time conversation, regardless of the reason, there can be no communication. Phones and radios are essentially unusable until the usable bit rate on the network improves to the point where real-time communications can commence again.

Regardless of the reason, dropped calls are both an annoyance and inefficient. Often when a call is dropped, both parties will attempt to reconnect by calling each other at the same time, resulting in a busy signal, or the transfer of one or both parties into voice mail. Or if a person has moved beyond range of a wireless network, the parties must wait until the person is again in network range to resume communication. In either case, a new connection must be established and a new conversation started before the parties can resume communication.

SUMMARY OF THE INVENTION

A method for conducting a conversation. The method involves establishing a conversation between a first communication device and a second communication device over a connection on a network and continually determining during the conversation when the usable bit rate on the connection is either (i) at or above a bit rate threshold or (ii) below the bit rate threshold. The bit rate threshold is defined as the transmission bit rate that is sufficient for available media to be transmitted over the connection and rendered in near real-time by the recipient. The method further involves, depending on the determined usable bit rate either (i) when the usable bit rate on the connection is at or above a bit rate threshold (a) transmitting the media as it becomes available at the first communication device to the second communication device at or above the bit rate threshold and (b) enabling the media transmitted at or above the bit rate threshold to be rendered at the second communication device in near real-time in a real-time rendering mode. Alternatively (ii) when the ascertained usable bit rate on the connection falls below the bit rate threshold (c) storing the media at the first communication device when the ascertained usable bit rate on the connection falls below the bit rate threshold and (d) transmitting the media from storage to the second communication device as conditions on the connection permit when the usable bit rate falls below the bit rate threshold. Thus the conversation may continue in a time-shifted mode when the usable bit rate is (ii) below the bit rate threshold and may resume in near real-time in the real-time rendering mode when the usable bit rate is (i) at or above the bit rate threshold after falling below the bit rate threshold.

BRIEF DESCRIPTION OF THE DRAWINGS

The invention may best be understood by reference to the following description taken in conjunction with the accompanying drawings, which illustrate specific embodiments of the invention.

FIG. 2 is a plot illustrating the graceful degradation of wireless network services versus range in according to the present invention.

FIG. 3 is a plot illustrating the graceful degradation of network services versus capacity according to the present invention.

FIGS. 7A through 7I illustrate a series of user interfaces of two parties engaged in a conversation during a dropped conversation in accordance with the present invention.

It should be noted that like reference numbers refer to like elements in the figures.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The term "media" as used herein is intended to broadly mean virtually any type of media, such as but not limited to, voice, video, text, still pictures, sensor data, GPS data, or just about any other type of media, data or information.

As used herein, the term "conversation" is also broadly construed. In one embodiment, a conversation is intended to mean a thread of messages, strung together by some common attribute, such as a subject matter or topic, by name, by participants, by a user group, or some other defined criteria. In another embodiment, the messages of a conversation do not necessarily have to be tied together by some common attribute. Rather one or more messages may be arbitrarily assembled into a conversation. Thus a conversation is intended to mean two or more messages, regardless if they are tied together by a common attribute or not.

Figure 1A:
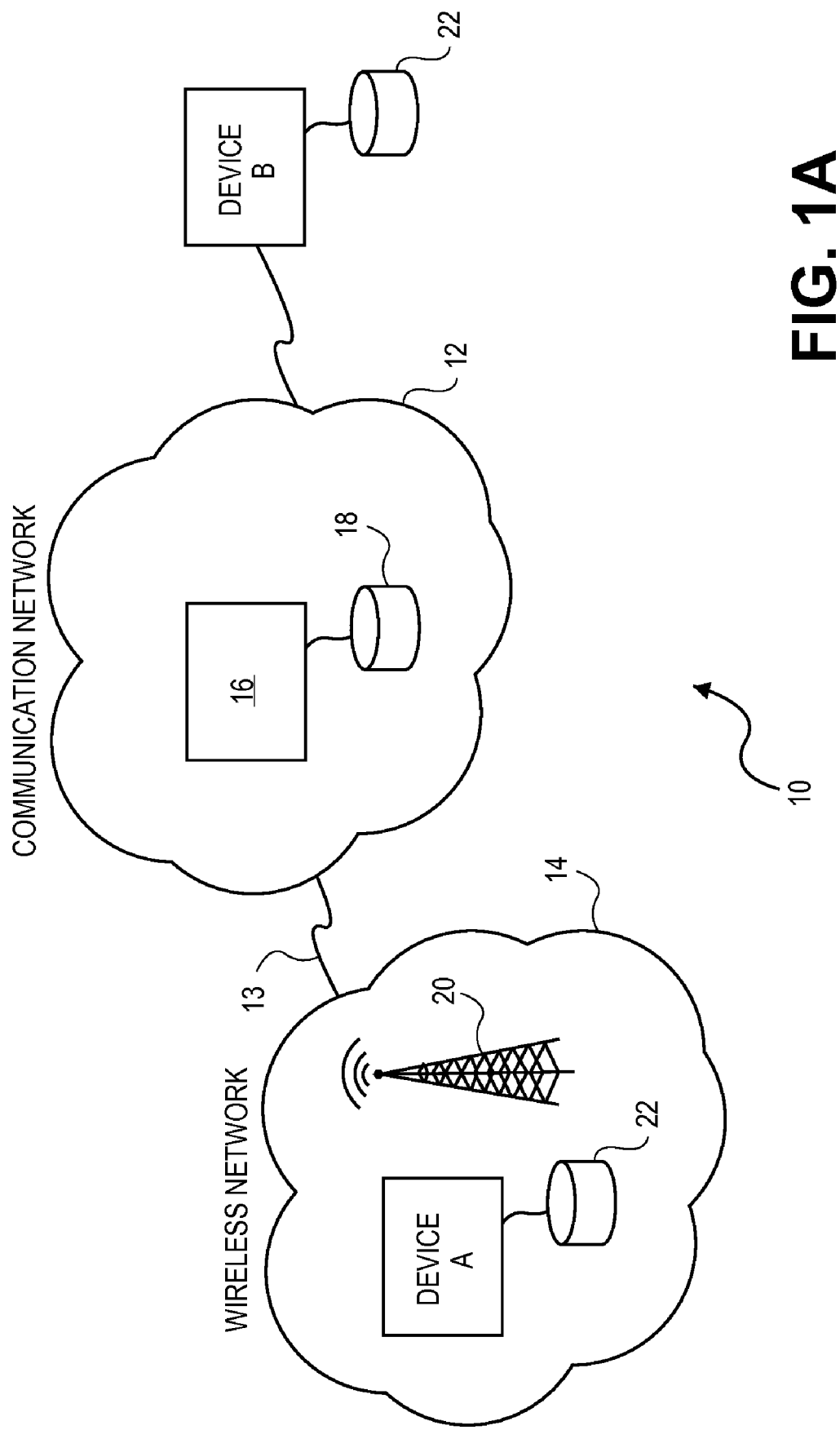
FIG. 1A is a diagram illustrating an exemplary wireless communication system.

Referring to FIG. 1A, a diagram illustrating an exemplary wireless communication system is shown. The exemplary communication system 10 includes a communication network 12 and a wireless network 14 for enabling media communication between a wireless device A within the wireless network 14 and a second communication device B connected to the network 12. A gateway connection 13 connects the communication network 12 and the wireless network 14. The communication network 12 may include one or more hops 16 between the wireless network 14 and the second communication device B. Each hop may include a storage element 18 for the persistent storage of media. The communication device A, which is a wireless device, such as either a mobile phone or a radio, connects through a wireless network connection with the wireless network 14 through a radio transceiver 20. The communication devices A and B each include a storage element 22 for the persistent storage of media respectively.

When a conversation takes place between device A and device B, a network connection is made between the two devices through the communication network 12 and the wireless network 14. All media of the conversation, regardless if it was transmitted or received, is persistently stored in the storage elements 22 of devices A and B as well as optionally in the one or more hop(s) 16 with persistent storage 18 on the network 12 between the two devices. For more details on the persistent storage of the media at each communication device and on the network, see the co-pending and commonly assigned U.S. application Ser. Nos. 12/028,400 and 12/192,890, both incorporated by reference herein.

Figure 1B:
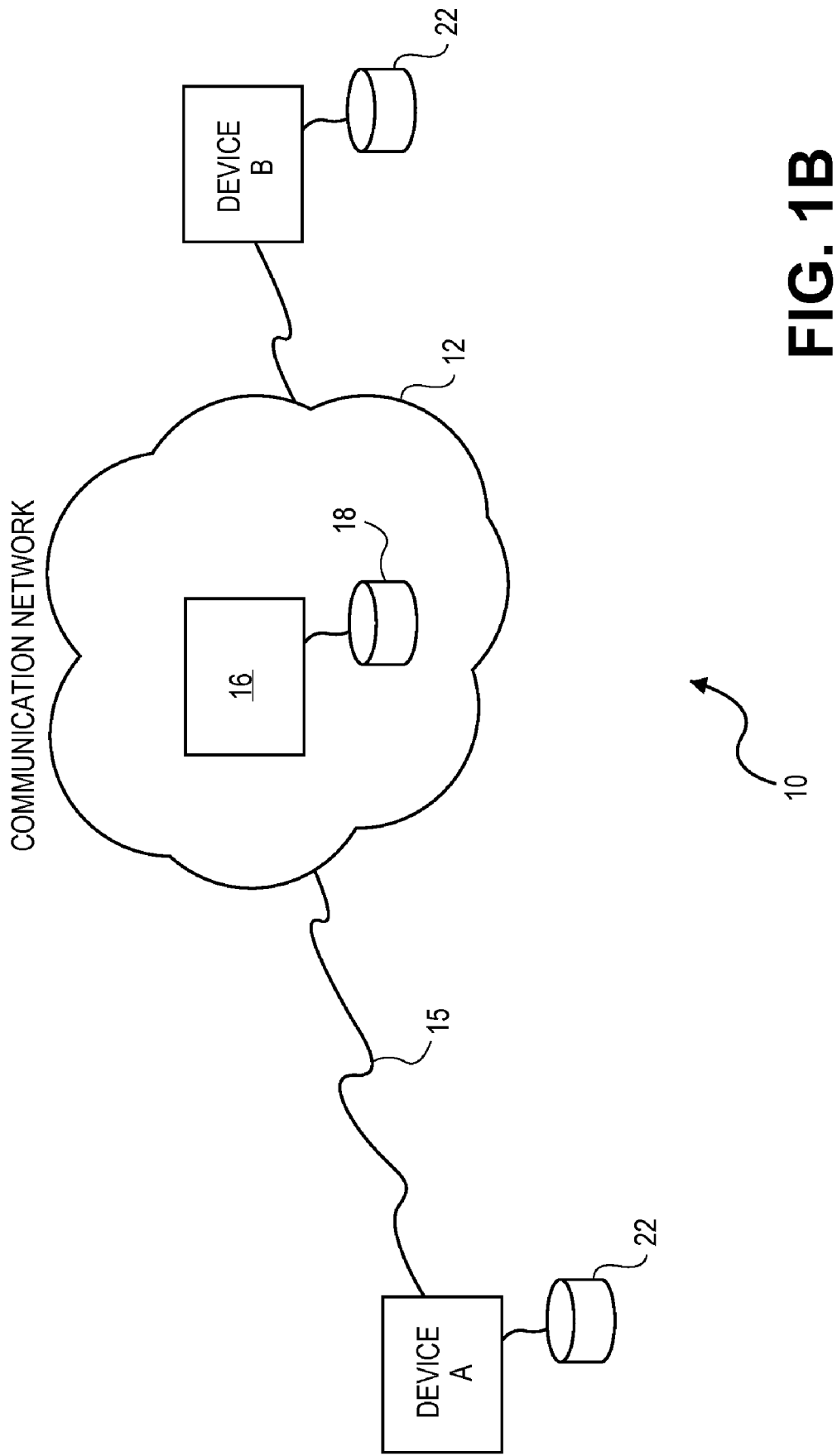
FIG. 1B is a diagram of an exemplary wired communication system.

Referring to FIG. 1B, a diagram illustrating another exemplary communication system of the present invention is shown. In this embodiment, both devices A and B are connected to communication network 12. Device A is connected to the network 12 through a wired connection 15. When a conversation takes place between device A and device B, a network connection is established between the two devices across network 12. One or more hops 16, each optionally with persistent storage 18, may be used in establishing the network connection between the two devices.

It should be noted that the specific network configuration and the communication devices illustrated in FIGS. 1A and 1B are exemplary. In no way, however, should either particular configuration be construed as limiting. In various embodiments, networks 12 and 14 can both be wireless, wired, or any combination thereof. Also, either communication device A or device B can each be either wired or wireless devices. The communication devices A and B can also be two nodes in the same wireless or wired networks or two nodes in different networks. If nodes in different networks, the two networks can communicate directly with one another, or they may communicate through any number gateways or hops in intermediate wired or wireless communication networks. For the sake of simplicity, the network connection illustrated in FIGS. 1A and 1B is between just two communication devices.

The present invention, however, may be used with conversations involving any number of wireless or wired communication devices.

The embodiments shown in FIGS. 1A and 1B both rely on the client-server model to establish communication between two (or more) communication devices. It should be understood that the present invention as described herein may also be used in a peer-to-peer model where two or more communication devices communicate directly with one another over a network.

In the embodiment illustrated in FIGS. 1A and 1B, both devices A and B locally and persistently store the media of the conversation in storage elements 22 respectively. It is not necessary, however, for both devices to persistently store the media of the conversation locally. For device A to continue transmitting during a dropped conversation, all that is required is for device A to persistently store the media of the conversation. For device A to receive media during a dropped conversation, the received media must be persistently stored at one or more locations. The one or more locations can be the transmitting communication device, a server hope 16 on the network, or both.

Figure 4:
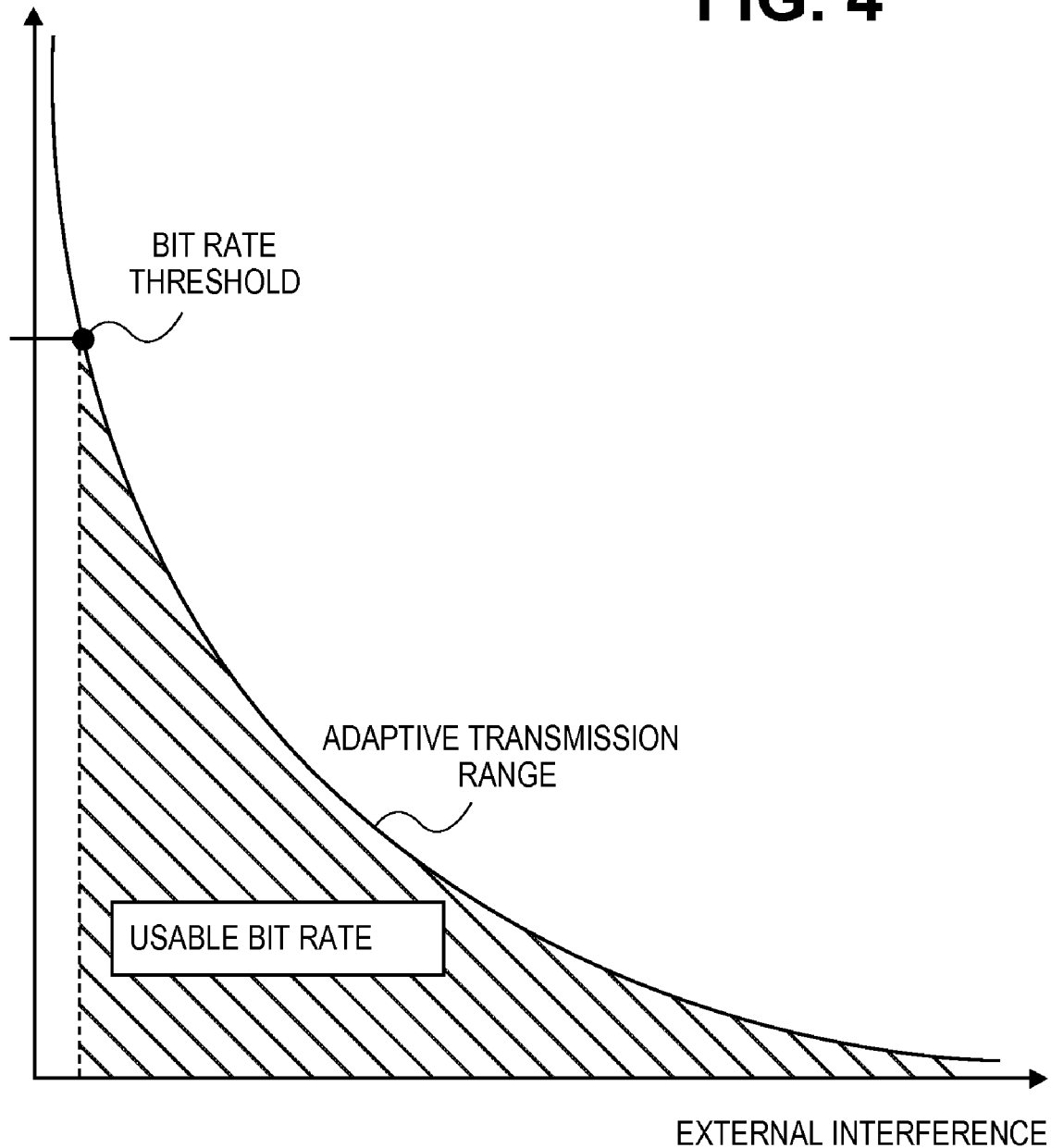
FIG. 4 is a plot illustrating the graceful degradation of network services in the presence of external interference according to the present invention.

FIGS. 2 through 4 illustrate the graceful degradation of services with respect to range, capacity and external interferences that may affect the network respectively. It should be understood that the graceful degradation of services with respect to range is applicable only to wireless networks. The graceful degradation of services with regard to capacity and external interferences, however, equally applies to both wired and wireless networks.

Referring to FIG. 2, a plot illustrating the graceful degradation of wireless services versus signal strength. The diagram plots the available usable bit rate on the network on the vertical axis verses the signal strength at the communication device 20 of the broadcast by the radio transceiver 20 on the horizontal axis. When the communication device A is relatively close, the available usable bit rate on the network is high. But as the communication device A travels away from the radio transceiver 20, the usable bit rate on the network connection is reduced, as represented by the downward slope of the usable bit rate curve on the plot. Signal strength is not necessarily a function of distance. Signal strength may also be adversely affected by other factors, such as terrain or other structures that may interfere or reduce signal strength. For example, if the person using the communication device A travels through a tunnel, canyon or mountainous region, or enters a building or elevator, signal strength may be reduced.

As the signal strength decreases, the amount of bit rate loss experienced on the network connection will also typically increase. At a certain point, a bit rate threshold is exceeded. Below this point, the bit rate loss typically becomes too large to maintain a real-time conversation with conventional wireless networks. In other words, the bit rate defines a minimum bit rate throughput sufficient for maintaining near real-time communication.

In one embodiment, the sending device A ascertains when the usable bit rate on the network connection falls below the bit rate threshold by: (i) receiving one or more reports each including a measured transfer rate at which bits transmitted over the network connection safely arrive at a recipient over a predetermined period of time; (ii) computing the usable bit rate on the network connection based on the received one or more reports; and (iii) comparing the computed usable bit rate with the bit rate threshold. The reports are generated by the recipient and sent to device A over the network connection. The receipt reports may include a notation of missing, corrupted or reduced bit rate representations of media as well as other network parameters such jitter.

In one embodiment, the bit rate threshold is set at eighty percent (80%) of the bit rate throughput needed to transmit and decode the full bit rate representation of voice media at the same rate the voice media was originally encoded. It should be noted that this percentage for voice media may vary and should not be construed as limiting. The throughput percentage rate may be higher or lower. With other types of media, the needed throughput may vary.

The portion of the usable bit rate curve below the bit rate threshold is defined as the adaptive transmission range. When the usable bit rate on the network is in the adaptive transmission range, device A transmits the media from persistent storage. As a result, the usable bit rate below the threshold becomes usable. Device A thus has the capacity to manage, by introducing latency, the transmission rate of media based on network conditions. Compared to conventional communication devices that have no ability to control the rate of transmission, communication effectively ceases when conditions on the network connection are insufficient to support near real-time or "live" communication.

The amount of latency associated with transmission below the bit rate threshold varies, typically depending on the signal strength between the communication device A and the radio transceiver 20. If the signal strength at the communication device A is just below the threshold, the amount of latency may be inconsequential. As signal strength progressively decreases, the usable bit rate also typically progressively decreases. As a result, more and more latency is introduced. As latency increases, the practicality of conducting a conversation in the live or real-time mode decreases. Beyond the point where a real-time conversation is no longer practical, communication can still take place, but in a time-shifted mode. A user may generate a message, which is persistently stored. As usable bit rate conditions on the network permit, transmissions of the media occur from persistent storage. Alternatively, when receiving messages, the media may trickle in over the network, also as usable bit rate conditions permit. When the quality or completeness of the received media becomes sufficiently good as transmissions are received, they may be retrieved from persistent storage and reviewed or rendered at the receiving device A. Communication can therefore still take place when signal strength is poor, due to either device A being a relatively far distance from a transceiver 20 or in a location of poor coverage, such as in a tunnel or canyon.

As illustrated in the plot, the available usable bit rate gets progressively less as the signal strength decreases. Eventually the usable bit rate is reduced to nothing, meaning the communication device A is effectively disconnected from the wireless network 14. The persistent storage of media on the communication device A still allows limited communication capabilities, even when entirely disconnected from the network. Messages can be generated and stored on communication device A, while disconnected from the network. As the device returns within the adaptive transmission range, the usable bit rate range is used for the transmission of the messages in persistent storage. Alternatively, the user of communication device A may review previously received messages from storage while disconnected from the network and receive new messages as usable bit rate on the network permits.

Referring to FIG. 3, a plot illustrating the graceful degradation of wireless and wired services versus the number of users is shown. As illustrated in the Figure, the available usable bit rate per user increases as the number of users decreases and vice-versa. As the number of users increases, the usable bit rate decreases. Eventually, the bit rate threshold is crossed. Below this threshold, all users of the network are forced to operate in the adaptive transmission range when sending and receiving messages. In an alternative embodiment, only certain users may be forced into the adaptive transmission range to preserve the usable bit rate of the system for other users who will continue to operate with a usable bit rate above the throughput threshold. The system may decide which users are provided either full or reduced service based on one or more priority schemes, such different levels of subscription services, those first on the network have higher priority than those that have recently joined the network, or any other mechanism to select certain users over other users.

Referring to FIG. 4, a plot illustrating the graceful degradation of wireless and wired services in the presence of an external interference is shown. In this diagram, as the severity of the external interference increases, as represented along the horizontal axis, the usable bit rate decreases and vice versa. In situations where the available usable bit rate falls below the bit rate threshold, the user of communication device A may continue communicating in the adaptive transmission range in the same manner as described above. The use of persistent storage of media and the managing of transmissions to meet available usable bit rate therefore increases system robustness and gracefully extends the effective range and capacity of services in situations where external interference would otherwise prevent communication.

Figure 5:
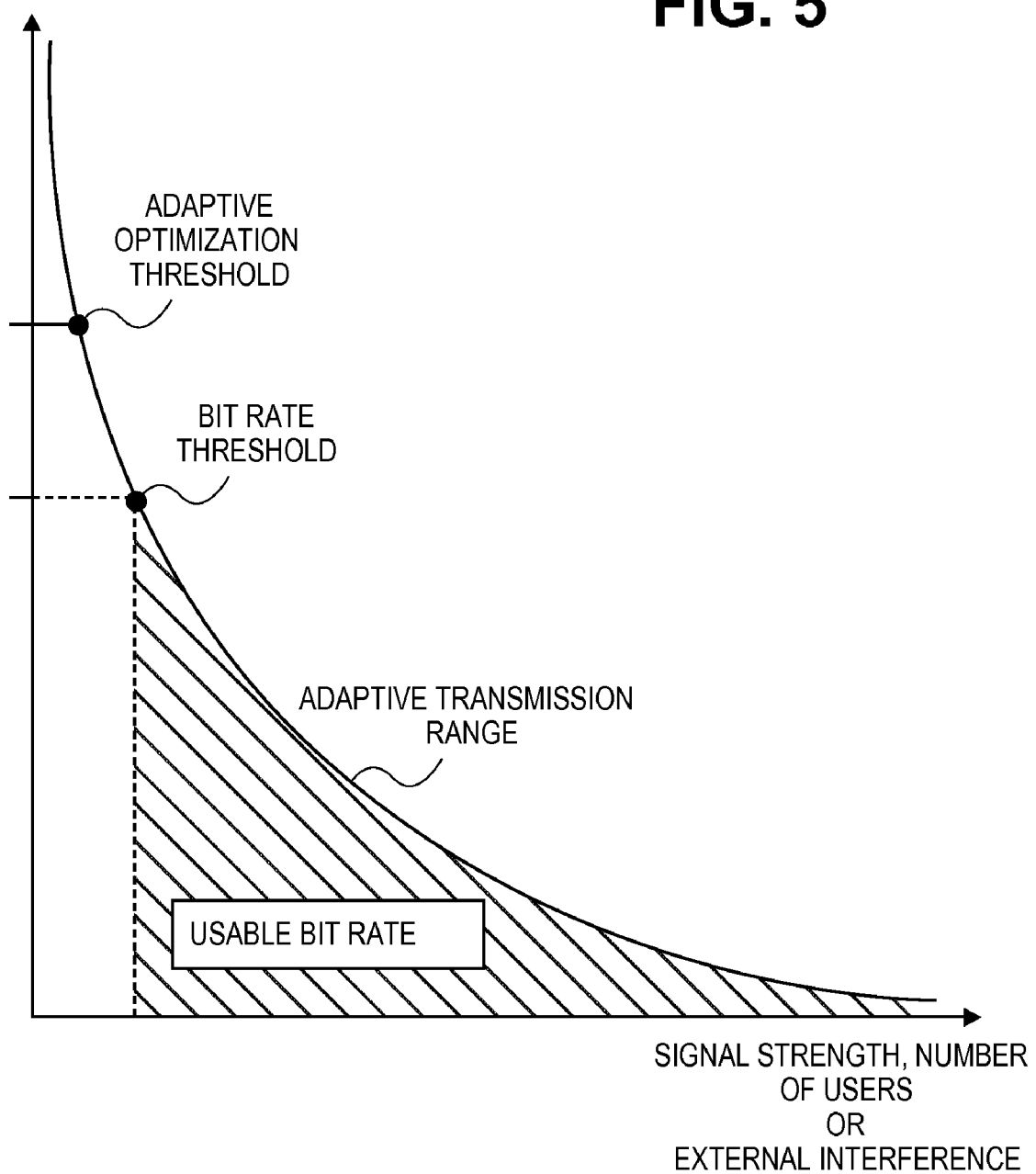
FIG. 5 is a plot illustrating adaptive live optimization for further extending the graceful degradation of services according to another embodiment of the present invention is shown.

Referring to FIG. 5, a plot illustrating adaptive live optimization for further extending the graceful degradation of wired and wireless services according to another embodiment is shown. In the plot, the usable bit rate curve includes an adaptive optimization threshold and the bit rate threshold. In the above-mentioned U.S. application Ser. Nos. 12/028,400 and 12/192,890, adaptive live optimization techniques for maintaining a conversation in the live or real-time mode when the usable bit rate on the network falls below the adaptive optimization threshold are described.

Adaptive live optimization techniques involve ascertaining if the media to be transmitted is time sensitive or not and the continuous monitoring of the usable or Maximum Available Bit Rate (MABR) on the network at a transmitting device. The time-sensitivity of the media is determined by either a declared or inferred intent of a recipient to review the media immediately upon receipt. The MABR is ascertained from receipt reports, which include network parameters such as corrupted or missing packets (i.e., media loss) as well as possibly other parameters, including jitter for example, sent by a receiving device.

When time-sensitive media (e.g., the media of a "live" conversation) is to be transmitted, the Real Time Bit Rate (RTBT) needed to transmit a full bit rate representation of the media is compared with the MABR. The full bit rate representation of the media is derived from when the media was originally encoded. If the MABR exceeds the RTBR, then the full bit rate version of the media is transmitted at the RTBR. On the other hand if the RTBR is greater than the MABR, then one or more techniques may be applied to generate a reduced bit rate version of the media. According to various embodiments, these techniques may include using (i) different codec settings; (ii) different codecs; (iii) a compression algorithm; or (iv) any combination of (i) through (iii). By transmitting a reduced bit rate version of the media, the ability to extend the "live-ness" of conversation is enhanced.

These adaptive live optimization techniques have the net effect of pushing the bit rate threshold down the usable bit rate curve. In other words, by applying the adaptive live optimization techniques, the amount of available usable bit rate or MABR needed on the network for conducting a real-time conversation is reduced. This is evident in the FIG. 5, which shows the bit rate threshold pushed further down the usable bit rate curve relative to the plots illustrated in FIGS. 2, 3 and 4.

With persistent storage, media transmissions may occur from storage. Media transmissions therefore do not have to occur as the media is being generated. Instead, at times when the usable bit rate is insufficient for real-time transmissions, the media may be transmitted from persistent storage as network conditions (i.e., the MABR) permit. When transmitting from persistent storage, a certain amount of latency may be introduced during the back and forth transmissions of the conversation. The ability to transmit out of persistent storage, however, effectively extends the usability of the network beyond the signal strength and/or number of users where conventional wireless or wired networks would otherwise fail. As a result, communications can still take place, even when the usable bit rate conditions on the network are poor or constrained beyond where previously no communication could take place.

In some situations, the latency in delivering the media may be very large so that live communication is impractical or impossible, or small enough so that delivery time may be tolerable for the participants to continue conversing, albeit more in a time-shifted mode than a real-time mode. Furthermore, if the usable or MABR improves to the point sufficient to support live communication, then the participants may opt to continue the conversation in real-time.

Conversations as described in the above-mentioned U.S. application Ser. Nos. 12/028,400 and 12/192,890 differ than conventional telephone conversations. With a typical telephone call, a telephone number is dialed and a conversation takes place only if a circuit connection is made. When the parties hang up, the conversation is over. If the parties wish to speak again, one party will dial the other, and a new conversation takes place if a new circuit connection is established. In the Ser. Nos. 12/028,400 and 12/192,890 applications, it is assumed that communication devices, such as phones or computers, are always connected to the network. As a result, the notion of a conversation is not dependent on the existence of a network connection per se. Rather conversations may be ongoing or open-ended. Participants may contribute to a conversation whenever they wish, conversing either "live" in a near real-time mode or asynchronously in a time-shifted mode. A conversation is terminated only when it is explicitly ended.

In reality, it is difficult for a communication device to always be connected to the network. With mobile communication devices, such as mobile phones and radios, the device may wander outside of network range, or into an area of poor coverage, such as in a tunnel, mountainous region, or canyon. Similarly with wired devices, such as computers, network connectivity can be adversely affected for a number of reasons, such as equipment problems, a disruption of services, or too much traffic on the network. Regardless of the reason, a degradation or loss of network services typically resulted in the inability to communicate. With the graceful degradation of services as described herein, live communication may still take place, even when conditions on the network are so poor that it would otherwise prevent live communication.

Figure 6A:
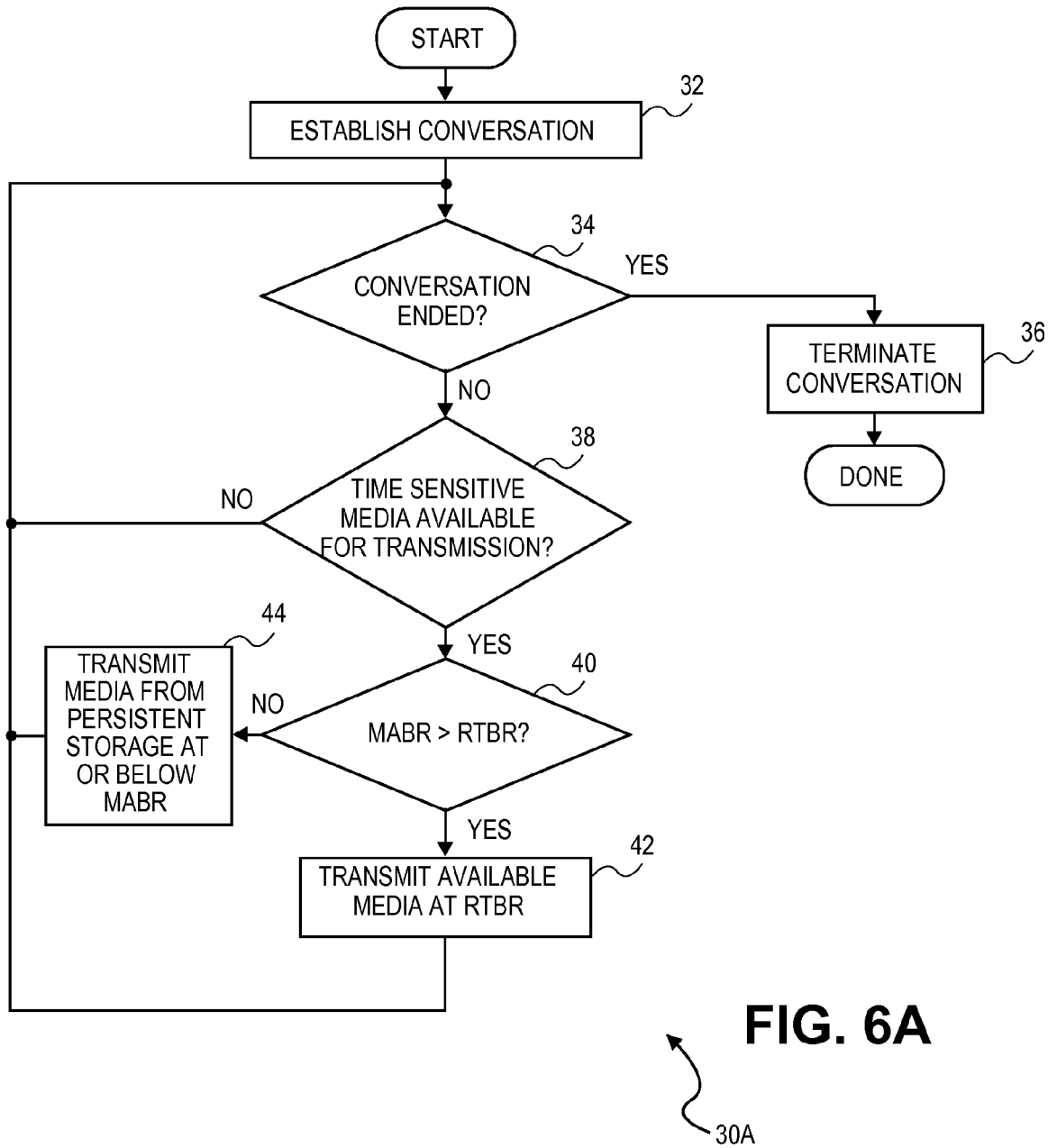
FIGS. 6A and 6B are flow charts illustrating sequences for enabling communication to continue when conditions on the network cause a conversation to be dropped and to resume the same conversation when network conditions improve in accordance with two embodiments of the present invention respectively.

Referring to FIG. 6A, a flow chart 30A illustrating a sequence for enabling time-sensitive communication to continue during a conversation when conditions on the network are poor or the connection is altogether dropped and to resume the same conversation when network conditions improve is shown. In the initial step, a conversation is established (box 32) between two or more participants, each using a communication device. During the course of the conversation, it is continually determined if either or both of the parties has ended the conversation (decision 34). If yes, the conversation is terminated (box 36) and the process is done. If the conversation is still ongoing, then it is continually determined (decision 38) if any time-sensitive media is available for transmission (e.g., the user of the transmitting device begins speaking, creating video, etc.).

When time-sensitive media is available for transmission, the usable bit rate on the network or MABR is compared to the RTBR needed to transmit the media at a rate sufficient to be consumed in real-time by the recipient (decision 40). If the MABR is greater than the RTBR (MABR>RTBR), then the available media is transmitted at the RTBR (box 42). If the MABR is not sufficient, then the media is transmitted from persistent storage at or below the MABR (box 44) as network conditions permit. Depending on the actual MABR, the latency in delivering the media may be large or small.

While the conversation is ongoing, the above process is repeated until the conversation is terminated. Whenever time-sensitive media becomes available, it is transmitted at either the RTBR or from persistent storage at or below the MABR as network conditions permit. With non-time sensitive media, the media is sent at the MABR as described above, but not illustrated in FIG. 6A.

Figure 6B:
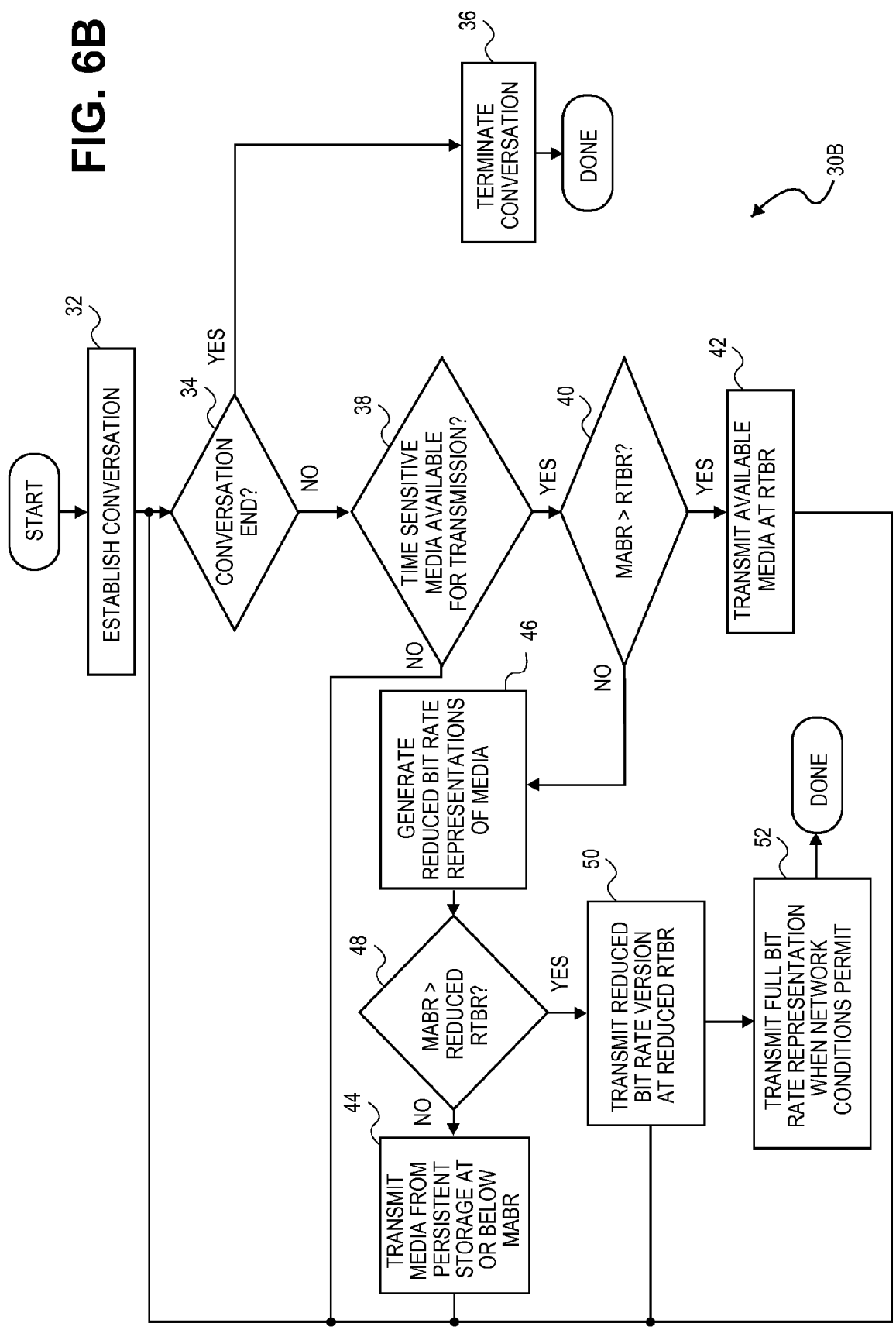

Referring to FIG. 6B, a flowchart 30B according to an alternative embodiment is illustrated. The flow chart 30B is essentially the same as 30A, but with the addition of the adaptive live optimization techniques as described above. When it is determined in decision 40 that the MABR is less than the RTBR (MABR<RTBR) for live communication, then a reduced bit rate representation of the media may be generated (box 46). The reduced bit rate version of the media may be generated using any of the techniques mentioned above. Thereafter in decision 48, the MABR is then compared to the RTBR needed to transmit the reduced bit rate version of the media (hereafter referred to as the "reduced RTBR"). If the MABR is greater than the reduced RTBR, then the reduced bit rate version is transmitted at the reduced RTBR (box 50). Alternatively if the MABR is less than the reduced RTBR, then the media is transmitted from persistent storage as the MABR permit (box 44). Again, so long as the conversation is ongoing, the above process is repeated for available media. In box 52, a full bit rate representation of the transmitted reduced bit rate representation of the media may optionally be eventually transmitted as network conditions permit. The transmission of the full bit rate representation may occur either during or after the parties terminate the conversation. In this manner, the recipient communication device eventually persistently stores a complete copy of the media of the conversation.

In the embodiments described above with regard to FIGS. 6A and 6B, media created using a transmitting communication device is transmitted out of persistent storage when the MABR is less than either the RTBR or the reduced RTBR. In other embodiments, all media of the conversation, whether created on or received by a communication device, is persistently stored in time indexed order on the communication device, regardless if the MABR is above or below the RTBR or reduced RTBR. By persistently storing all the media of a conversation, a conversation may be conducted in either the live in a real-time rendering mode or a time-shifted rendering mode, and the participants may seamlessly transition the conversation between the two modes at their convenience. For more details, see the above-mentioned U.S. application Ser. Nos. 12/028,400 and 12/192,890.

Referring to FIGS. 7A through 7I, a sequence of user interfaces on the devices of two parties engaged in a "live" conversation in the near real-time mode. In this example, a conversation is taking place between Sam Fairbanks and Jill Wright. Both are using mobile phones. Sam is driving and enters into a tunnel during the conversation. While in the tunnel, Sam's connectivity to the network is essentially lost. The sequence of screen shots on Sam and Jill's devices illustrate how the two can not only continue the conversation while Sam is disconnected from the network, but can resume the conversation "live" or in real-time as Sam exists the tunnel and reconnects to the network.

Figure 7A:
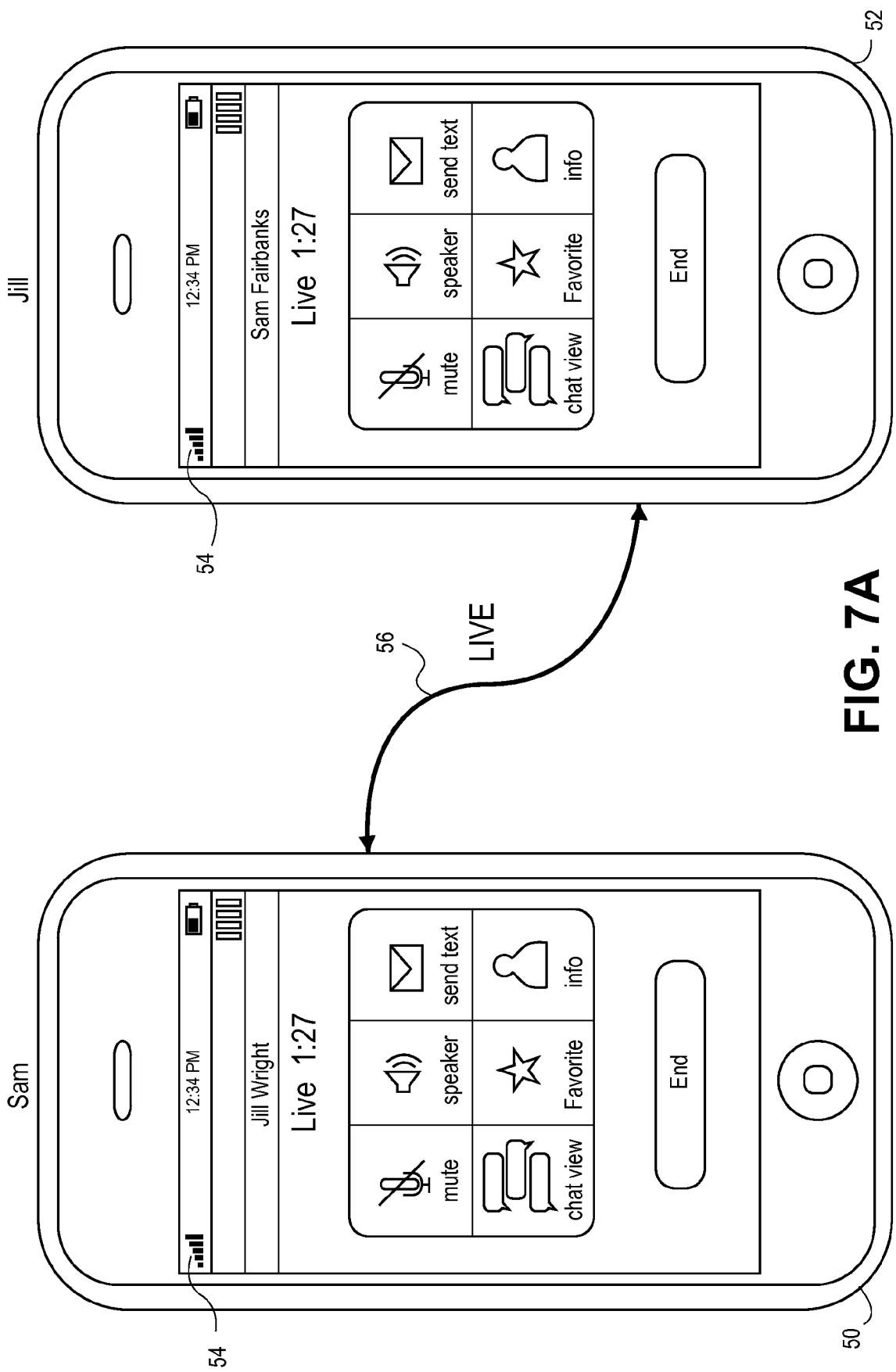

FIG. 7A illustrates the ongoing conversation between Sam and Jill. The user interface on Sam's device 50 is illustrated on the left side of the figure, while the user interface of Jill's device 52 is on the right side. Each interface includes a signal strength indicator 54, which shows a graphical representation of the usable bit rate on the network (i.e., signal strength) for each device 50 and 52 respectively. The arrow 56 is representative of the "live" conversation between Sam and Jill.

FIG. 7B shows the user interfaces of devices 50 and 52 after Sam enters the tunnel and connectivity is lost. On Sam's device 50, a message "You have lost connectivity" appears on the interface. In addition, the interface presents Sam with the options of "Keep Talking", "Notify When Available" (i.e., when Sam is back on the network) or "End" to end the conversation. The signal strength indicator 54 also shows that Sam's device 50 is essentially disconnected from the network. On the interface on device 52, Jill is notified that "Sam has gone offline". Jill is also presented with the same options of "Keep Talking", "Notify When Available" (i.e., when Sam reconnects to the network) or "End" the conversation. In this example, Sam elects to continue the conversation, in spite of the lost connectivity, by selecting the "Keep Talking" option.

Figure 7C:
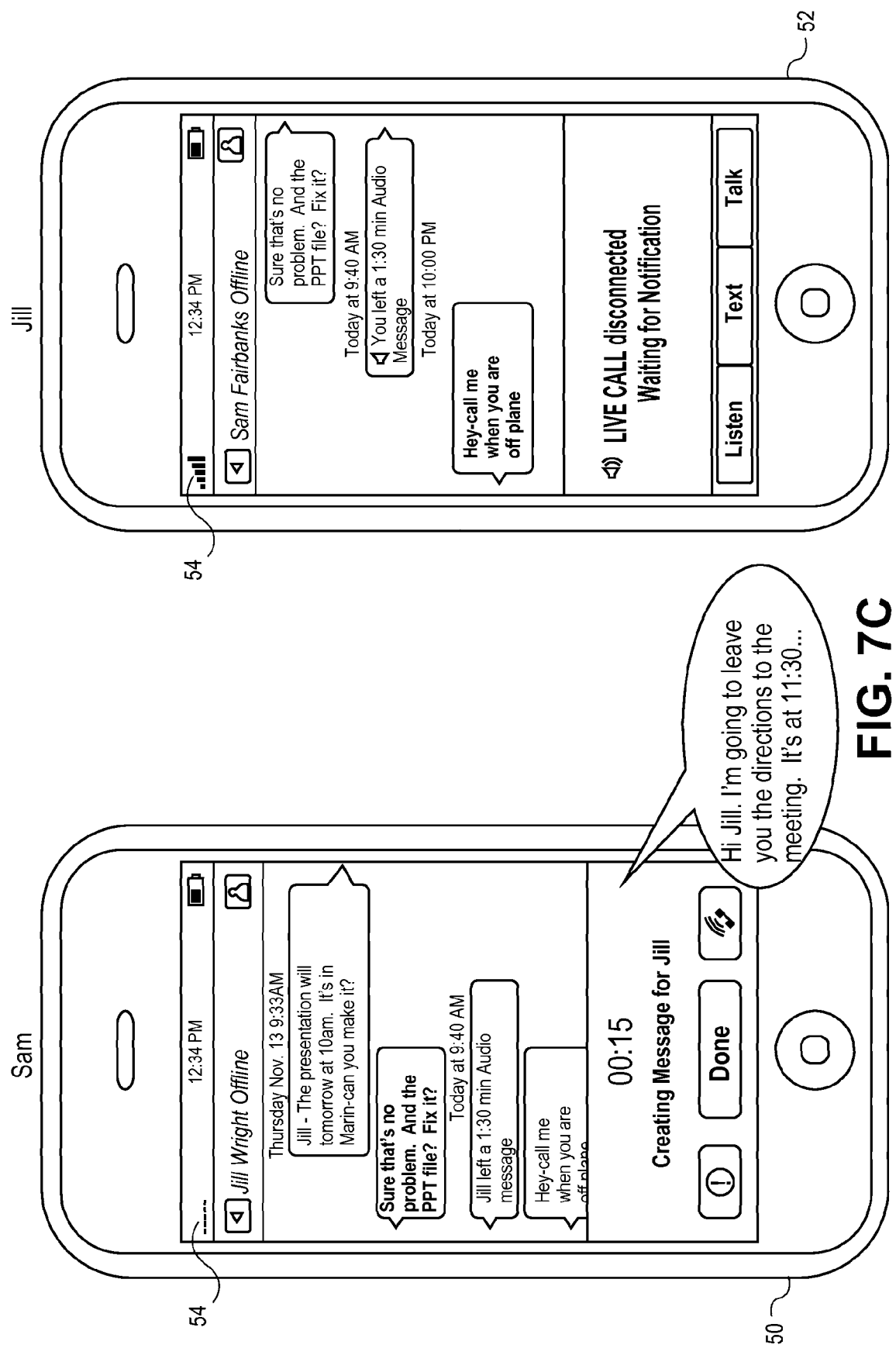

In FIG. 7C, the user interface of device 50 indicates that Sam is in the process of speaking and creating a message (e.g., directions) for Jill. The user interface on Jill's device 52 indicates that the connection with Sam was essentially lost and is awaiting notification when Sam is back on the network.

FIG. 7D shows the user interfaces of the two devices 50 and 52 as Sam exits the tunnel and reconnects to the network. Sam's interface indicates that his device 50 is sending the message he created while in the tunnel, from persistent storage, to Jill. The signal strength indicator 54 also shows that device 50 is reconnected to the network. On Jill's device 52, the interface indicates that Sam is back online and speaking. Device 52 also presents three icons "Listen", "Text" or "Talk", which give Jill the options of listening to the incoming message, texting a message to Sam, or resume talking to Sam respectively. In this example, Jill elects the "Talk" option.

FIG. 7E shows the user interfaces of the two devices 50 and 52 after Jill selects the "Talk" option. In this example, Jill informs Sam that she is "here" and she wants to know "where did we leave off." The arrow 56 indicates that the conversation has resumed in the real-time mode.

Figure 7F:
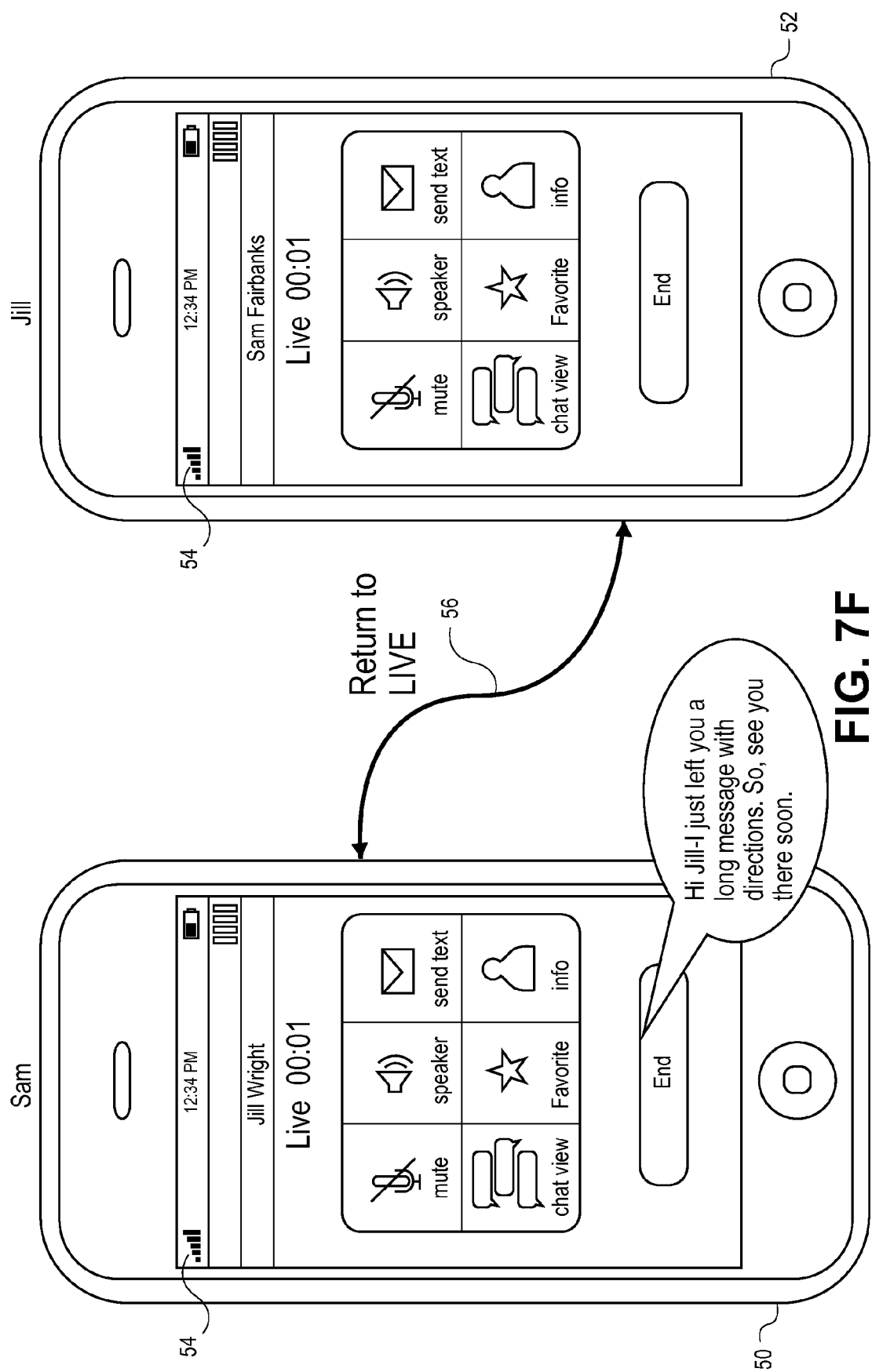

In FIG. 7F, Sam replies by informing Jill he left her a long message with the directions to a meeting Jill is attending.

In FIG. 7G, Sam and Jill agree to terminate the conversation. The user interfaces on the two devices 50 and 52 both indicate the conversation has terminated by displaying "End Conversation".

FIG. 7H shows the user interface of the two devices 50 and 52 after the conversation has terminated. The user interfaces on the two devices 50 and 52 both show the history of the conversation, including message bubbles 58 indicating that Sam left Jill an audio message while Sam was in the tunnel. Using the "Listen" icon 60 appearing on device 52, Jill may elect to listen to the message.

As illustrated in FIG. 7I, a window 62 appears in the interface of device 52 after Jill elects to listen to the message bubble 58 on her communication device. Within the window 62, Jill is provided with a number of options to render Sam's message, such as play faster, jump back, pause, jump forward, etc. In this example, Jill elects to review the message at the normal rendering rate. As the message is played, Jill hears the driving instructions left by Sam as the message is rendered. The duration of the message is graphically displayed on a time bar.

In the above example, connectivity to the network is determined by ascertaining the usable bit rate on the connection between the devices 50 and 52. When the ascertained usable bit rate falls below the bit rate threshold, as Sam drives into the tunnel in this example, live or real-time communication can no longer take place. As Sam emerges from the tunnel and signal strength improves, the ascertained usable bit rate will eventually meet or exceed the threshold. When this occurs, Sam and Jill may resume their conversation live or in the real-time mode. In an alternative embodiment, the adaptive transmission techniques as described above may be used by Sam's device to maintain or extend the "live-ness" of the conversation. In either case, when the ascertained usable bit rate falls below either the RTBR or the reduced RTBR, then real-time communication can no longer take place.

Any media created by Sam when not in the live or real-time communication mode may still be transmitted from persistent storage at or below the ascertained usable bit rate on the network connection. The amount of media transmitted from persistent storage, however, depends on conditions on the network connection. In an extreme situation, for example when Sam is deep into the tunnel, the usable bit rate on the connection may be at or near zero. As a result, no or virtually no media created by Sam may be transmitted. But as Sam emerges from the tunnel, media may be transmitted from persistent storage as signal strength increases and conditions on the network connection improve. Eventually when Sam exists the tunnel, the usable bit rate on the network connection will likely exceed the bit rate threshold. At this point, not only may Sam and Jill resume their conversation in the live or real-time communication mode, but any media not already transmitted, is transmitted to Jill from persistent storage.

Thus when the usable bit rate is either at or above the RTBR or the reduced RTBR, then the conversation may be optionally conducted either in the (i) live or near real-time rendering mode or (ii) in the time-shifted rendering mode. In the latter, messages may be reviewed by the recipient at any arbitrary time. In addition, the participants of the conversation may seamlessly transition between the two modes (i) and (ii). On the other hand when the usable bit rate is below the RTBR or the reduced RTBR, the conversation can only be conducted in the time-shifted mode. If the amount of latency is minimal, the participants may still be able to communicate in a manner that is close to live. But as the latency increases, the ability to communicate in a "live" fashion diminishes.

It should be noted that the various messages, icons and notifications mentioned above with regard to FIGS. 7A through 7I are merely exemplary. A wide variety different messages, icons and notifications, including audible, visual, text or icon based indicators may be used, either alone or in combination. Those provided above should therefore be considered representative of the different functions as described herein rather than limiting the scope of the invention.

Figure 8:
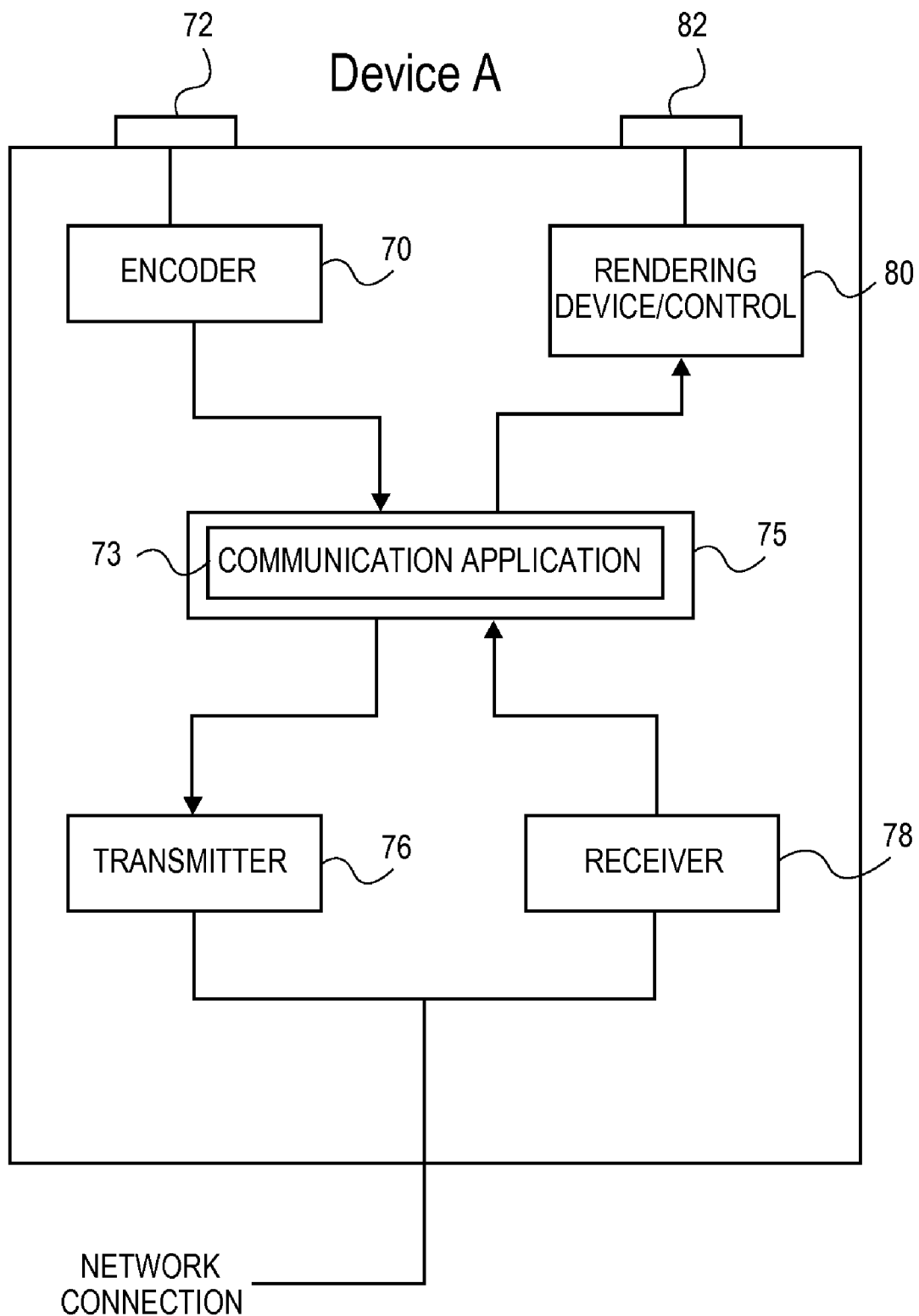
FIG. 8 is a diagram of a communication device with persistent storage in accordance with the present invention.

Referring to FIG. 8, a diagram of device A is illustrated. The device A includes an encoder 70 configured to receive media from a media generating device 72, such as a microphone, video camera, sensor, or GPS device, a communication application 73 which defines persistent storage 22 (not shown) and is configured to run or be executed on processor core 75, a transmitter 76, a receiver 78, a rendering/control device 80 and a media rendering device 82, such as a speaker and/or display. For more details on the operation of device A and the communication application 73, see U.S. device 13 and the client application 12 as described in application Ser. Nos. 12/028,400 and 12/192,890 respectively.

The aforementioned description is described in relation to a wired or wireless communication devices. It should be understood that the same techniques and principles of the present invention also apply to the hops 16 between a sending and a receiving pair in either a wireless or wired network. In the case of a hop 16, media is typically not generated on these devices. Rather these devices receive media from another source, such as a phone, radio or another hop on the network, and are responsible for optionally persistently storing the received media and forwarding the media on to the next hop or the recipient as described above.

The above example as illustrated in FIGS. 7A through 7I is described in the context of a conversation conducted between Sam and Jill over a wireless network while each is using a mobile communication device, such as a cell phone or radio. It should be understood that this example should not be construed as limiting in any way. Rather the communication apparatus and method as described herein be applied to any communication system, including mobile or cellular phone networks, police, fire, military taxi, and first responder type communication systems, legacy circuit-based networks, VoIP networks, the Internet, or any combination thereof. Further, communication devices may be one of the following: landline phone, wireless phone, cellular phone, satellite phone, computer, radio, server, satellite radio, tactical radio or tactical phone The types of media besides voice that may be generated on a communication device and transmitted may further include video, text, sensor data, position or GPS information, radio signals, or a combination thereof.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A method for conducting a conversation, comprising:
    establishing a conversation between a first communication device and a second communication device over a connection on a network;
    persistently storing on the first communication device media of the conversation transmitted by the first communication device and received from the second communication device;

determining during the conversation when the usable bit rate on the connection is either at or above a bit rate threshold or below the bit rate threshold, the bit rate threshold defining a transmission bit rate sufficient for the media to be decipherable when transmitted to and rendered by the second communication device in near real-time, and performing, depending on the determined usable bit rate, the following:

transmitting the media as it becomes available at the first communication device to the second communication device at or above the bit rate threshold so that the second communication device can render the available media in near real-time when the usable bit rate on the connection is at or above a bit rate threshold; and transmitting the media from persistent storage to the second communication device as conditions on the connection permit when the ascertained usable bit rate on the connection falls below the bit rate threshold, whereby the conversation may continue in a time-shifted mode when the usable bit rate is below the bit rate threshold and may resume in near real-time when the usable bit rate is at or above the bit rate threshold.

2. The method of claim 1, further enabling, when the usable bit rate is at or above the bit rate threshold, the transmitted media to be optionally rendered at the second communication device either in near real-time or at an arbitrary later time in the time-shifted mode.

3. The method of claim 2, further enabling the seamless transition of the rendering of the transmitted media at the second communication device between the time-shifted mode and near real time.

4. The method of claim 1, wherein persistently storing the transmitted media means storage for a time period beyond what is needed to transmit the media.

5. The method of claim 1, wherein transmitting the media further comprises transmitting a full bit rate version of the media, wherein the full bit rate version of the media is created when the media is originally encoded.

6. The method of claim 1, further comprising:

generating at the first communication device a reduced bit rate version of the media created using the first communication device when the usable bit rate is below the bit rate threshold; and transmitting the reduced bit rate version of the media.

7. The method of claim 6, wherein the reduced bit rate version of the media is generated by one of the following: (i) using different Codec settings; (ii) using different Codecs; (iii) using a compression algorithm; or (iv) any combination of (i) through (iii).

8. The method of claim 6, further comprising transmitting the full bit rate version of the media corresponding to the transmitted reduced bit rate version of the media when conditions on the connection permit.

9. The method of claim 1, wherein transmitting the media from persistent storage when the usable bit rate falls below the bit rate threshold further comprises transmitting the media from persistent storage over the connection within an adaptive transmission range on the connection, wherein the adaptive transmission range is defined as the bit rate on the connection below the bit rate threshold.

10. The method of claim 1, wherein the network connection is either a wireless or wired network connection.

11. The method of claim 1, wherein the network connection comprises a first connection between the first communication device and one or more hops on the network and a second connection between the second communication device and the one or more hops.

12. The method of claim 1, wherein the first and second communication devices each comprise one of the following: land-line phone, wireless phone, cellular phone, satellite phone, computer, radio, server, satellite radio, tactical radio or tactical phone.

13. The method claim 1, wherein the media comprises one or more of the following types of media: video, text, sensor data, position or GPS information, radio signals, or a combination thereof.

14. The method of claim 1, wherein the usable bit rate is the maximum available bit rate on the connection.

15. A communication device for conducting a conversation over a connection on a network, comprising:

a conversation element configured to establish a conversation between the communication device and a second communication device over the connection on the network;

a persistent storage element configured to persistently store at the communication device the media of the conversation transmitted by the communication device and received from the second communication device;

a transmission element configured to determine when media is available for transmission during the conversation if the usable bit rate on the connection is either at or above a bit rate threshold or below the bit rate threshold, and the transmission element further configured, depending on the determined usable bit rate, to perform the following:

(i) transmit media of the conversation as the media is created at the communication device to the second communication device, at a transmission rate at or above the bit rate threshold, so that the second communication device can selectively render the media in near real-time when the determined usable bit rate is at or above the bit rate threshold; and (ii) transmit the media from persistent storage to the second communication device as conditions on the connection permit when the determined usable bit rate is below the bit rate threshold, whereby the conversation may continue in a time-shifted mode when the usable bit rate is below the bit rate threshold and may resume in near real-time or the time-shifted mode when the usable bit rate is at or above the bit rate threshold.

16. The device of claim 15, wherein the transmission element is further configured to transmit the media, when the usable bit rate is at or above the bit rate threshold, so that the second communication device may selectively render the transmitted media in near real-time or at an arbitrary later time in the time-shifted mode.

17. The device of claim 15, wherein persistent storage of the transmitted media means storage for a time period beyond what is needed for transmission.

18. The device of claim 15, wherein the transmission element is further configured to transmit a full bit rate version of the media, wherein the full bit rate version of the media is created when the media is originally encoded.

19. The device of claim 15, wherein the transmission element is further configured to:

generate at the communication device a reduced bit rate version of the media when the usable bit rate is below the bit rate threshold; and transmit the reduced bit rate version of the media.

20. The device of claim 19, wherein the transmission element generates the reduced bit rate version of the media by one of the following: (i) using different Codec settings; (ii) using different Codecs; (iii) using a compression algorithm; or (iv) any combination of (i) through (iii).

21. The device of claim 19, wherein the transmission element is further configured to transmit the full bit rate version of the media corresponding to the transmitted reduced bit rate version of the media when conditions on the connection permit.

22. The device of claim 15, wherein the transmission element is further configured to transmit the media from persistent storage within an adaptive transmission range on the connection, wherein the adaptive transmission range is defined as the bit rate on the connection below the bit rate threshold.

23. The device of claim 15, wherein the network connection is either a wireless or wired network connection.

24. The device of claim 15, wherein the network connection comprises a first connection between the communication device and one or more hops on the network and a second connection between the second communication device and the one or more hops.

25. The device of claim 15, wherein the communication device comprises one of the following: land-line phone, wireless phone, cellular phone, satellite phone, computer, radio, server, satellite radio, tactical radio or tactical phone.

26. The device claim 15, wherein the media comprises one or more of the following types of media: video, text, sensor data, position or GPS information, radio signals, or a combination thereof.

27. The method of claim 15, wherein the usable bit rate is the maximum available bit rate on the connection.

28. The method of claim 15, wherein the bit rate threshold is defined as a transmission bit rate sufficient for media created during the conversation by the communication device to be decipherable when transmitted to and rendered by the second communication device in near real-time.

29. Computer code embedded in a non-transitory computer readable medium and intended to run on a communication device connected to a network, the computer code configured to:
  establish a conversation between the communication device and a second communication device over the connection on the network;
  persistently store at the communication device the media of the conversation transmitted by the communication device and received from the second communication device;
  determine when media is available for transmission during the conversation if the usable bit rate on the connection is either at or above a bit rate threshold or below the bit rate threshold, and
  perform, depending on the determined usable bit rate, one of the following:
  (i) transmit media of the conversation as the media is created at the communication device to the second communication device, at a transmission rate at or above the bit rate threshold, so that the second communication device can selectively render the media in near real-time when the determined usable bit rate is at or above the bit rate threshold; and
  (ii) transmit the media from persistent storage to the second communication device as conditions on the connection permit when the determined usable bit rate is below the bit rate threshold,
  whereby the conversation may continue in a time-shifted mode when the usable bit rate is below the bit rate threshold and may resume in near real-time or the time-shifted mode when the usable bit rate is at or above the bit rate threshold.

30. The code of claim 29, wherein the code is further configured to transmit the media, when the usable bit rate is at or above the bit rate threshold, so that the second communication device may selectively render the transmitted media in near real-time or at an arbitrary later time in the time-shifted mode.

31. The code of claim 29, wherein persistent storage of the transmitted media means storage for a time period beyond what is needed for transmission.

32. The code of claim 29, wherein the code is further configured to transmit a full bit rate version of the media, wherein the full bit rate version of the media is created when the media is originally encoded.

33. The code of claim 29, wherein the code is further configured to:
  generate at the communication device a reduced bit rate version of the media when the usable bit rate is below the bit rate threshold; and
  transmit the reduced bit rate version of the media.

34. The code of claim 33, wherein the code is further configured to generate the reduced bit rate version of the media by one of the following: (i) using different Codec settings; (ii) using different Codecs; (iii) using a compression algorithm; or (iv) any combination of (i) through (iii).

35. The code of claim 34, wherein the code is further configured to transmit the full bit rate version of the media corresponding to the transmitted reduced bit rate version of the media when conditions on the connection permit.

36. The code of claim 29, wherein the code is further configured to transmit the media from persistent storage within an adaptive transmission range on the connection, wherein the adaptive transmission range is defined as the bit rate on the connection below the bit rate threshold.

37. The code of claim 29, wherein the network connection is either a wireless or wired network connection.

38. The code of claim 29, wherein the network connection comprises a first connection between the communication device and one or more hops on the network and a second connection between the second communication device and the one or more hops on the network.

39. The code of claim 29, wherein the communication device configured to run the code comprises one of the following: land-line phone, wireless phone, cellular phone, satellite phone, computer, radio, server, satellite radio, tactical radio or tactical phone.

40. The code claim 29, wherein the media comprises one or more of the following types of media: video, text, sensor data, position or GPS information, radio signals, or a combination thereof.

41. The code of claim 29, wherein the usable bit rate is the maximum available bit rate on the connection.

42. The code of claim 29, wherein the bit rate threshold is defined as a transmission bit rate sufficient for media created during the conversation by the communication device to be decipherable when transmitted to and rendered by the second communication device in near real-time.

* * * * *